United States Patent
Abraham et al.

(10) Patent No.: US 9,585,025 B2
(45) Date of Patent: Feb. 28, 2017

(54) MANAGING TRANSMIT POWER FOR BETTER FREQUENCY RE-USE IN TV WHITE SPACE

(75) Inventors: Santosh Paul Abraham, San Diego, CA (US); Sameer Vermani, San Diego, CA (US); Hemanth Sampath, San Diego, CA (US); Stephen J. Shellhammer, Ramona, CA (US); Rahul Tandra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 707 days.

(21) Appl. No.: 13/397,473

(22) Filed: Feb. 15, 2012

(65) Prior Publication Data

US 2013/0044680 A1 Feb. 21, 2013

Related U.S. Application Data

(60) Provisional application No. 61/443,587, filed on Feb. 16, 2011.

(51) Int. Cl.
*H04W 16/14* (2009.01)
*H04W 52/32* (2009.01)
(Continued)

(52) U.S. Cl.
CPC ......... *H04W 16/14* (2013.01); *H04W 52/325* (2013.01); *H04W 52/367* (2013.01);
(Continued)

(58) Field of Classification Search
None
See application file for complete search history.

(56) References Cited

U.S. PATENT DOCUMENTS 6,404,756 B1  6/2002  Whitehill et al.
6,643,469 B1  11/2003  Gfeller et al.
(Continued)

FOREIGN PATENT DOCUMENTS

CN  101048975 A  10/2007
CN  101277271 A  10/2008
(Continued)

OTHER PUBLICATIONS

International Search Report and Written Opinion—PCT/US2012/025500—ISA/EPO—Jun. 19, 2012.
(Continued)

*Primary Examiner* — Hassan Phillips
*Assistant Examiner* — Saba Tsegaye
(74) *Attorney, Agent, or Firm* — Dang M. Vo

(57) ABSTRACT

Certain aspects of the present disclosure provide techniques and apparatus for managing transmit power in a television white space (TVWS) network. By managing transmit power as described herein, medium re-use may be improved in such a network, and unfair usage problems may be alleviated. One example method generally includes receiving, from an apparatus, a message with an indication of a highest transmit power used by the apparatus for transmitting data frames; and determining that the apparatus is a dominant interferer based, at least in part, on the highest transmit power. Another example method generally includes receiving, from an apparatus, a control or management message with a first indication of a first transmit power used by the apparatus for transmitting data frames; and determining that the apparatus is a dominant interferer based, at least in part, on the first transmit power.

66 Claims, 26 Drawing Sheets

(51) Int. Cl.
*H04W 52/36* (2009.01)
*H04W 48/12* (2009.01)
*H04W 52/24* (2009.01)
*H04W 74/08* (2009.01)

(52) U.S. Cl.
CPC .......... *H04W 48/12* (2013.01); *H04W 52/242* (2013.01); *H04W 52/246* (2013.01); *H04W 74/0808* (2013.01)

(56) References Cited

U.S. PATENT DOCUMENTS

| | | | |
|---|---|---|---|
| 6,859,466 | B1 | 2/2005 | Chen et al. |
| 7,117,003 | B2 | 10/2006 | Kayama et al. |
| 7,787,410 | B2 | 8/2010 | Ding et al. |
| 7,809,394 | B1 | 10/2010 | Li et al. |
| 7,983,230 | B1* | 7/2011 | Li et al. ........................ 370/338 |
| 8,320,358 | B2 | 11/2012 | Wang et al. |
| 8,358,625 | B2 | 1/2013 | Koskinen |
| 8,504,091 | B2 | 8/2013 | Palanki et al. |
| 8,582,485 | B2 | 11/2013 | Fischer et al. |
| 8,594,120 | B2 | 11/2013 | Mangold et al. |
| 8,675,557 | B2 | 3/2014 | Le |
| 8,831,519 | B2 | 9/2014 | Ghaboosi et al. |
| 9,185,455 | B2 | 11/2015 | Chen et al. |
| 2002/0191573 | A1* | 12/2002 | Whitehill et al. ............ 370/338 |
| 2003/0118131 | A1* | 6/2003 | Kobylinski et al. ......... 375/341 |
| 2004/0166887 | A1 | 8/2004 | Laroia et al. |
| 2005/0122912 | A1 | 6/2005 | Jeon et al. |
| 2005/0185733 | A1 | 8/2005 | Tolli et al. |
| 2005/0250528 | A1* | 11/2005 | Song et al. ................... 455/522 |
| 2006/0058054 | A1 | 3/2006 | Hiramatsu |
| 2006/0178151 | A1* | 8/2006 | Lappetelainen et al. ..... 455/450 |
| 2007/0140168 | A1 | 6/2007 | Laroia et al. |
| 2008/0144493 | A1 | 6/2008 | Yeh |
| 2009/0005094 | A1 | 1/2009 | Lee et al. |
| 2009/0197590 | A1 | 8/2009 | Borran et al. |
| 2010/0014502 | A1 | 1/2010 | Singh et al. |
| 2010/0091724 | A1 | 4/2010 | Ishii et al. |
| 2010/0189093 | A1 | 7/2010 | Palanki et al. |
| 2011/0013533 | A1* | 1/2011 | Bennett ......................... 370/252 |
| 2011/0013561 | A1 | 1/2011 | Liu et al. |
| 2011/0110349 | A1 | 5/2011 | Grandhi |
| 2011/0116487 | A1* | 5/2011 | Grandhi ........................ 370/338 |
| 2011/0171914 | A1 | 7/2011 | Kim et al. |
| 2011/0194542 | A1 | 8/2011 | Kim et al. |
| 2012/0014289 | A1* | 1/2012 | Ortega et al. ................. 370/255 |
| 2012/0113971 | A1 | 5/2012 | Giaretta et al. |
| 2012/0115523 | A1 | 5/2012 | Shpak |
| 2012/0120892 | A1 | 5/2012 | Freda et al. |
| 2012/0135780 | A1 | 5/2012 | Sun et al. |
| 2012/0169541 | A1* | 7/2012 | Singh ........................... 342/417 |
| 2012/0314681 | A1 | 12/2012 | Chen et al. |
| 2013/0044681 | A1 | 2/2013 | Abraham et al. |
| 2013/0148517 | A1 | 6/2013 | Abraham et al. |
| 2013/0215985 | A1 | 8/2013 | Lee et al. |
| 2013/0343341 | A1 | 12/2013 | Kim et al. |
| 2014/0105133 | A1* | 4/2014 | Kim et al. .................... 370/329 |

FOREIGN PATENT DOCUMENTS

| | | |
|---|---|---|
| EP | 1315309 A2 | 5/2003 |
| EP | 1713288 A2 | 10/2006 |
| EP | 2068466 A1 | 6/2009 |
| JP | 2004208197 A | 7/2004 |
| JP | 2004533791 A | 11/2004 |
| JP | 2008252867 A | 10/2008 |
| JP | 2009515481 A | 4/2009 |
| JP | 2009111968 A | 5/2009 |
| JP | 2009118320 A | 5/2009 |
| JP | 2009520433 A | 5/2009 |
| JP | 2009177396 A | 8/2009 |
| JP | 2010098339 A | 4/2010 |
| KR | 20040014551 A | 2/2004 |
| WO | 02082751 A2 | 10/2002 |
| WO | 03003657 A1 | 1/2003 |
| WO | WO-2004077685 A2 | 9/2004 |
| WO | WO-2006046201 A1 | 5/2006 |
| WO | 2007056081 A1 | 5/2007 |
| WO | 2007080495 A2 | 7/2007 |
| WO | 2008105316 A1 | 9/2008 |
| WO | WO-2009099813 A1 | 8/2009 |
| WO | 2011007576 A1 | 1/2011 |
| WO | 2011011557 A1 | 1/2011 |
| WO | 2012112807 A1 | 8/2012 |

OTHER PUBLICATIONS

Sum, C.S., "Modification on DFS and DCF procedure adapting to FCC rules in TVWSPart 2: Hidden Node", Internet Citation, Feb. 27, 2010, pp. 1-19, XP007918747.

Varvarigos E.A., et al., "The Slow Start Power Controlled MAC Protocol for Mobile ad Hoc Networks and its Performance Analysis", Ad Hoc Networks, Elsevier, Amsterdam, NL, vol. 7, No. 6, Aug. 1, 2009, pp. 1136-1149, XP026038013.

You L., et al., "A multi-channel MAC using no dedicated control channels for wireless mesh networks", Wireless Communications & Signal Processing, 2009, WCSP 2009, International Conference on, IEEE, Piscataway, NJ, USA, Nov. 13, 2009, pp. 1-5, XP031594937, ISBN: 978-1-4244-4856-2.

Zeng, Y., et al., "Worldwide Regulatory and Standardization Activities on Cognitive Radio", New Frontiers in Dynamic Spectrum, 2010 IEEE Symposium on, IEEE, Piscataway, NJ, USA, Apr. 6, 2010 pp. 1-9, XP031664828.

Jing Zhu et al., "Leveraging Spatial reuse in 802.11 mesh networks with enhanced physical carrier sensing", Communications, 2004 IEEE International Conference, IEEE, Jun. 20, 2004, URL: http://ieeexplore.ieee.org/stamp/stamp.jsp"tp=&arnumber=1313303.

Zhu, et al., "Adapting physical carrier sensing to maximize spatial reuse in 802.11 mesh networksm" Wireless Communications and Mobile Computing, 2004, vol. 4, pp. 933-946.

Trainin S., D0.1 Comment Resolution,IEEE P802.11 Wireless LANs,Jul. 15, 2010,IEEE 802.1110/0947r1, pp. 1-7, URL,https://mentor.ieee.org/802.11/dcn/10/11-10-0947-01-00ad-comment-resolution-1-solomon.doc.

Yee J., et al., CID 125 Transmit Power Control Clarifications,IEEE P802.11 Wireless LANs,Jan. 17, 2011,IEEE 802.11-10/1112r0, pp. 1-4, URL,https://mentor.ieee.org/802.11/dcn/11/11-11-0071-02-00ad-cid125-transmit-power-control-clarifications.doc.

Ahuja R., et al., "Cognitive Radio System using IEEE 802.11 a over UHF TVWS", New Frontiers in Dynamic Spectrum Access Networks, 2008. DySPAN 2008. 3rd IEEE Symposium, 2008, p. 1-9.

Myles A., et al., "Draft Normative Text Proposal; 11-02-0402-00-000h-draft-normative-text-proposal," IEEE Draft; 11-02,0402-00-000H-Draft-Normative-Textproposal, IEEE-SA Mentor, Piscataway, NJ USA, Jun. 27, 2002 (Jun. 27, 2002), vol. 802.11 h, pp. 1-74, XP017692514, [retrieved on Jun. 27, 2002].

N/A: "Lb84 Cid 6780 Text Proposal ; 11-06-0813-04-000n-lb84-cid-6780-text-proposal," IEEE Draft; 11-06-0813-04-000N-LB84-CID-6780-Text-Proposal, IEEE-SA Mentor, Piscataway, NJ USA, Jul. 14, 2006 (Jul. 14, 2006), vol. 802.11 n, No. 4, pp. 1-3, XP017686925, [retrieved on Jul. 14, 2006].

<span style="font-family: calibri;">Ghosh M., "Cognitive Radio for the TV White Spaces," Philips, Philips Research North America, Jun. 21, 2009, pp. 1-34.

Sang Yun Lee et al: "Area spectrum efficiency of TV White Space wireless system with transmit power control" Advanced Communication Technology (ICACT) , 2010 the 12th International Conference on, IEEE, Piscataway, NJ, USA, Feb. 7, 2010 (Feb. 7, 2010), pp. 1061-1066, XP031653742, ISBN: 978-1-4244-5427-3.

Wang J., et al., "First Cognitive Radio Networking Standard for Personal/Portable Devices in TV White Spaces", IEEE Symposium on New Frontiers in Dynamic Spectrum, Apr. 6, 2010, pp. 1-12, IEEE, XP031664849, ISBN: 978-1-4244-5189-0.

* cited by examiner

FCC Device Modes for TVWS

| Type | Subtype | Max EIRP | No. of Chan | DB Access | Geo Loc. | |
|---|---|---|---|---|---|---|
| Fixed | Fixed | 4 W | 48 | Yes | Yes | Must check availability of the channel at least once a day. Must cease immediately if channel is not available. |
| Mobile/ Portable | Mode 1 | 100 mW | 30 | No | No | Must obtain a list of available channels over the air from a fixed or Mode II device. Must verify availability of channel every 60 s. Must stop using channel if the channel cannot be verified. |
| | Mode 2 | 100 mW | 30 | Yes | Yes | -- Needs to check the database at least once a day<br>-- Combines own geo location information with database information to determine available channels.<br>-- Access to database may be through any technology.<br>-- Needs to check location every 60 s<br>-- If location has changed by more than 100 m,<br>--- availability of channel at new location must be checked. |

FIG. 4

MANAGING TRANSMIT POWER FOR BETTER FREQUENCY RE-USE IN TV WHITE SPACE

CROSS-REFERENCE TO RELATED APPLICATIONS

This application claims benefit of U.S. Provisional Patent Application Ser. No. 61/443,587, filed Feb. 16, 2011, which is herein incorporated by reference. This application is also related to U.S. patent application Ser. No. 13/397,450, filed herewith and entitled "Managing Transmit Power for Better Frequency Re-Use in TV White Space," and to U.S. patent application Ser. No. 13/397,493, filed herewith and entitled "Managing Transmit Power for Better Frequency Re-Use in TV White Space," which are both herein incorporated by reference.

BACKGROUND

Field of the Invention

Certain aspects of the present disclosure generally relate to wireless communications and, more particularly, to managing transmit power in a television white space (TVWS) network.

Relevant Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements demanded for wireless communications systems, different schemes are being developed. One scheme known as "white-fi" entails expanding Wi-Fi technology with the unused frequency spectrum in the television (TV) band (i.e., the TV white space). An Institute of Electrical and Electronics Engineers (IEEE) 802.11af task group has been created to define an amendment to the IEEE 802.11 standard for using the TV white space (TVWS). The IEEE 802.11 denotes a set of Wireless Local Area Network (WLAN) air interface standards developed by the IEEE 802.11 committee for short-range communications (e.g., tens of meters to a few hundred meters). However, by using the TVWS with frequencies below 1 GHz, IEEE 802.11af may offer greater propagation distances to be achieved, in addition to the increased bandwidth offered by the unused frequencies in the TV spectrum.

SUMMARY

Certain aspects of the present disclosure generally relate to managing transmit power in a television white space (TVWS) network. By managing transmit power as described herein, medium re-use may be improved in such a network, and unfair usage problems may be alleviated.

Certain aspects of the present disclosure provide a first apparatus for wireless communications. The first apparatus generally includes a transmitter configured to transmit a sequence of request-to-send (RTS) messages at different transmit power levels to a second apparatus and a processing system configured to determine if a clear-to-send (CTS) message was received in response to at least one of the RTS messages corresponding to a particular one of the transmit power levels.

Certain aspects of the present disclosure provide a method for wireless communications. The method generally includes transmitting a sequence of RTS messages at different transmit power levels to an apparatus and determining if a CTS message was received in response to at least one of the RTS messages corresponding to a particular one of the transmit power levels.

Certain aspects of the present disclosure provide a first apparatus for wireless communications. The first apparatus generally includes means for transmitting a sequence of RTS messages at different transmit power levels to a second apparatus and means for determining if a CTS message was received in response to at least one of the RTS messages corresponding to a particular one of the transmit power levels.

Certain aspects of the present disclosure provide a computer-program product for wireless communications. The computer-program product generally includes a computer-readable medium having instructions executable to transmit a sequence of RTS messages at different transmit power levels to an apparatus and to determine if a CTS message was received in response to at least one of the RTS messages corresponding to a particular one of the transmit power levels.

Certain aspects of the present disclosure provide a wireless node. The wireless node generally includes at least one antenna; a transmitter configured to transmit, via the at least one antenna, a sequence of RTS messages at different transmit power levels to an apparatus; and a processing system configured to determine if a CTS message was received in response to at least one of the RTS messages corresponding to a particular one of the transmit power levels.

Certain aspects of the present disclosure provide a first apparatus for wireless communications. The first apparatus generally includes a receiver configured to receive from a second apparatus a packet that cannot be decoded by the first apparatus; a processing system configured to determine at least one of a time or a duration corresponding to the packet; and a transmitter configured to transmit a query with an indication of the at least one of the time or the duration, wherein the receiver is configured to receive a message from the second apparatus in response to the query, the message identifying the second apparatus as a source of the packet.

Certain aspects of the present disclosure provide a method for wireless communications. The method generally includes receiving, at a first apparatus from a second apparatus, a packet that cannot be decoded by the first apparatus; determining at least one of a time or a duration corresponding to the packet; transmitting a query with an indication of the at least one of the time or the duration; and receiving a message from the second apparatus in response to the query, the message identifying the second apparatus as a source of the packet.

Certain aspects of the present disclosure provide a first apparatus for wireless communications. The first apparatus generally includes means for receiving from a second apparatus a packet that cannot be decoded by the first apparatus; means for determining at least one of a time or a duration corresponding to the packet; and means for transmitting a query with an indication of the at least one of the time or the duration, wherein the means for receiving is configured to receive a message from the second apparatus in response to the query, the message identifying the second apparatus as a source of the packet.

Certain aspects of the present disclosure provide a computer-program product for wireless communications. The computer-program product generally includes a computer-readable medium having instructions executable to receive, at a first apparatus from a second apparatus, a packet that cannot be decoded by the first apparatus; to determine at least one of a time or a duration corresponding to the packet; to transmit a query with an indication of the at least one of the time or the duration; and to receive a message from the second apparatus in response to the query, the message identifying the second apparatus as a source of the packet.

Certain aspects of the present disclosure provide a wireless node. The wireless node generally includes at least one antenna; a receiver configured to receive, from an apparatus via the at least one antenna, a packet that cannot be decoded by the wireless node; a processing system configured to determine at least one of a time or a duration corresponding to the packet; and a transmitter configured to transmit, via the at least one antenna, a query with an indication of the at least one of the time or the duration, wherein the receiver is configured to receive a message from the apparatus in response to the query, the message identifying the apparatus as a source of the packet.

Certain aspects of the present disclosure provide a first apparatus for wireless communications. The first apparatus generally includes a transmitter configured to transmit a packet at a particular time with a certain duration, a receiver configured to receive from a second apparatus a query with an indication of at least one of a query time or a query duration for the packet, and a processing system. The processing system is typically configured to store at least one of the particular time or the certain duration for the packet and to determine that the at least one of the query time or the query duration substantially matches the at least one of the stored time or the stored duration, wherein the transmitter is configured to transmit a message to the second apparatus in response to the query, the message identifying the first apparatus as a source of the packet.

Certain aspects of the present disclosure provide a method for wireless communications. The method generally includes transmitting, at a first apparatus, a packet at a particular time with a certain duration; storing at least one of the particular time or the certain duration for the packet; receiving from a second apparatus a query with an indication of at least one of a query time or a query duration for the packet; determining that the at least one of the query time or the query duration substantially matches the at least one of the stored time or the stored duration; and transmitting a message to the second apparatus in response to the query, the message identifying the first apparatus as a source of the packet.

Certain aspects of the present disclosure provide a first apparatus for wireless communications. The first apparatus generally includes means for transmitting a packet at a particular time with a certain duration; means for storing at least one of the particular time or the certain duration for the packet; means for receiving from a second apparatus a query with an indication of at least one of a query time or a query duration for the packet; and means for determining that the at least one of the query time or the query duration substantially matches the at least one of the stored time or the stored duration, wherein the means for transmitting is configured to transmit a message to the second apparatus in response to the query, the message identifying the first apparatus as a source of the packet.

Certain aspects of the present disclosure provide a computer-program product for wireless communications. The computer-program product generally includes a computer-readable medium having instructions executable to transmit from a first apparatus a packet at a particular time with a certain duration; to store at least one of the particular time or the certain duration for the packet; to receive from a second apparatus a query with an indication of at least one of a query time or a query duration for the packet; to determine that the at least one of the query time or the query duration substantially matches the at least one of the stored time or the stored duration; and to transmit a message to the second apparatus in response to the query, the message identifying the first apparatus as a source of the packet.

Certain aspects of the present disclosure provide a wireless node. The wireless node generally includes at least one antenna; a transmitter configured to transmit, via the at least one antenna, a packet at a particular time with a certain duration; a receiver configured to receive, from an apparatus via the at least one antenna, a query with an indication of at least one of a query time or a query duration for the packet; and a processing system. The processing system is typically configured to store at least one of the particular time or the certain duration for the packet and to determine that the at least one of the query time or the query duration substantially matches the at least one of the stored time or the stored duration, wherein the transmitter is configured to transmit a message to the apparatus in response to the query, the message identifying the wireless node as a source of the packet.

Certain aspects of the present disclosure provide an apparatus for wireless communications. The apparatus generally includes a processing system configured to determine a highest transmit power for transmitting data frames from the apparatus and a transmitter configured to transmit a message with an indication of the highest transmit power.

Certain aspects of the present disclosure provide a method for wireless communications. The method generally includes determining a highest transmit power for transmitting data frames and transmitting a message with an indication of the highest transmit power.

Certain aspects of the present disclosure provide an apparatus for wireless communications. The apparatus generally includes means for determining a highest transmit power for transmitting data frames from the apparatus and means for transmitting a message with an indication of the highest transmit power.

Certain aspects of the present disclosure provide a computer-program product for wireless communications. The computer-program product generally includes a computer-readable medium having instructions executable to determine a highest transmit power for transmitting data frames from an apparatus and to transmit a message from the apparatus with an indication of the highest transmit power.

Certain aspects of the present disclosure provide an access point (AP). The AP generally includes at least one antenna, a processing system configured to determine a highest transmit power for transmitting data frames from the access point, and a transmitter configured to transmit, via the at least one antenna, a message with an indication of the highest transmit power.

Certain aspects of the present disclosure provide a first apparatus for wireless communications. The first apparatus generally includes a receiver configured to receive, from a second apparatus, a message with an indication of a highest transmit power used by the second apparatus for transmitting data frames; and a processing system configured to determine that the second apparatus is a dominant interferer based, at least in part, on the highest transmit power.

Certain aspects of the present disclosure provide a method for wireless communications. The method generally includes receiving, from an apparatus, a message with an indication of a highest transmit power used by the apparatus for transmitting data frames; and determining that the apparatus is a dominant interferer based, at least in part, on the highest transmit power.

Certain aspects of the present disclosure provide a first apparatus for wireless communications. The first apparatus generally includes means for receiving, from a second apparatus, a message with an indication of a highest transmit power used by the second apparatus for transmitting data frames; and means for determining that the second apparatus is a dominant interferer based, at least in part, on the highest transmit power.

Certain aspects of the present disclosure provide a computer-program product for wireless communications. The computer-program product generally includes a computer-readable medium having instructions executable to receive, from an apparatus, a message with an indication of a highest transmit power used by the apparatus for transmitting data frames; and to determine that the apparatus is a dominant interferer based, at least in part, on the highest transmit power.

Certain aspects of the present disclosure provide a wireless node. The wireless node generally includes at least one antenna; a receiver configured to receive, from an apparatus via the at least one antenna, a message with an indication of a highest transmit power used by the apparatus for transmitting data frames; and a processing system configured to determine that the apparatus is a dominant interferer based, at least in part, on the highest transmit power.

Certain aspects of the present disclosure provide an apparatus for wireless communications. The apparatus generally includes a processing system configured to determine a first transmit power for transmitting data frames from the apparatus and a transmitter configured to transmit a control or management message at a second transmit power, wherein the control or management message comprises a first indication of the first transmit power and a second indication of the second transmit power.

Certain aspects of the present disclosure provide a method for wireless communications. The method generally includes determining a first transmit power for transmitting data frames and transmitting a control or management message at a second transmit power, wherein the control or management message comprises a first indication of the first transmit power and a second indication of the second transmit power.

Certain aspects of the present disclosure provide an apparatus for wireless communications. The apparatus generally includes means for determining a first transmit power for transmitting data frames from the apparatus and means for transmitting a control or management message at a second transmit power, wherein the control or management message comprises a first indication of the first transmit power and a second indication of the second transmit power.

Certain aspects of the present disclosure provide a computer-program product for wireless communications. The computer-program product generally includes a computer-readable medium having instructions executable to determine a first transmit power for transmitting data frames from an apparatus and to transmit a control or management message at a second transmit power, wherein the control or management message comprises a first indication of the first transmit power and a second indication of the second transmit power.

Certain aspects of the present disclosure provide a wireless node. The wireless node generally includes at least one antenna; a processing system configured to determine a first transmit power for transmitting data frames from the wireless node; and a transmitter configured to transmit, via the at least one antenna, a control or management message at a second transmit power, wherein the control or management message comprises a first indication of the first transmit power and a second indication of the second transmit power.

Certain aspects of the present disclosure provide a first apparatus for wireless communications. The first apparatus generally includes a receiver configured to receive, from a second apparatus, a control or management message with a first indication of a first transmit power used by the second apparatus for transmitting data frames; and a processing system configured to determine that the second apparatus is a dominant interferer based, at least in part, on the first transmit power.

Certain aspects of the present disclosure provide a method for wireless communications. The method generally includes receiving, from an apparatus, a control or management message with a first indication of a first transmit power used by the apparatus for transmitting data frames and determining that the apparatus is a dominant interferer based, at least in part, on the first transmit power.

Certain aspects of the present disclosure provide a first apparatus for wireless communications. The first apparatus generally includes means for receiving, from a second apparatus, a control or management message with a first indication of a first transmit power used by the second apparatus for transmitting data frames; and means for determining that the second apparatus is a dominant interferer based, at least in part, on the first transmit power.

Certain aspects of the present disclosure provide a computer-program product for wireless communications. The computer-program product generally includes a computer-readable medium having instructions executable to receive, from an apparatus, a control or management message with a first indication of a first transmit power used by the apparatus for transmitting data frames; and to determine that the apparatus is a dominant interferer based, at least in part, on the first transmit power.

Certain aspects of the present disclosure provide a wireless node. The wireless node generally includes at least one antenna; a receiver configured to receive, from an apparatus via the at least one antenna, a control or management message with a first indication of a first transmit power used by the apparatus for transmitting data frames; and a processing system configured to determine that the apparatus is a dominant interferer based, at least in part, on the first transmit power.

Certain aspects of the present disclosure provide an apparatus for wireless communications. The apparatus generally includes a processing system configured to determine a modulation and coding scheme (MCS) for transmitting data frames from the apparatus and a transmitter configured to transmit a request message comprising an indication of the MCS.

Certain aspects of the present disclosure provide a method for wireless communications. The method generally includes determining a modulation and coding scheme (MCS) for transmitting data frames and transmitting a request message comprising an indication of the MCS.

Certain aspects of the present disclosure provide an apparatus for wireless communications. The apparatus generally includes means for determining a modulation and coding scheme (MCS) for transmitting data frames from the apparatus and means for transmitting a request message comprising an indication of the MCS.

Certain aspects of the present disclosure provide a computer-program product for wireless communications. The computer-program product generally includes a computer-readable medium having instructions executable to determine a modulation and coding scheme (MCS) for transmitting data frames from an apparatus; and to transmit a request message comprising an indication of the MCS.

Certain aspects of the present disclosure provide a wireless node. The wireless node generally includes at least one antenna; a processing system configured to determine a modulation and coding scheme (MCS) for transmitting data frames from the wireless node; and a transmitter configured to transmit, via the at least one antenna, a request message comprising an indication of the MCS.

Certain aspects of the present disclosure provide an apparatus for wireless communications. The apparatus generally includes a receiver configured to receive a request message comprising an indication of a modulation and coding scheme (MCS) for transmitting data frames to be received; a processing system configured to determine a link margin based on the MCS; and a transmitter configured to transmit a response message with an indication of the link margin.

Certain aspects of the present disclosure provide a method for wireless communications. The method generally includes receiving a request message comprising an indication of a modulation and coding scheme (MCS) for transmitting data frames to be received; determining a link margin based on the MCS; and transmitting a response message with an indication of the link margin.

Certain aspects of the present disclosure provide an apparatus for wireless communications. The apparatus generally includes means for receiving a request message comprising an indication of a modulation and coding scheme (MCS) for transmitting data frames to be received; means for determining a link margin based on the MCS; and means for transmitting a response message with an indication of the link margin.

Certain aspects of the present disclosure provide a computer-program product for wireless communications. The computer-program product generally includes a computer-readable medium having instructions executable to receive a request message comprising an indication of a modulation and coding scheme (MCS) for transmitting data frames to be received, to determine a link margin based on the MCS, and to transmit a response message with an indication of the link margin.

Certain aspects of the present disclosure provide a wireless node. The wireless node generally includes at least one antenna; a receiver configured to receive, via the at least one antenna, a request message comprising an indication of a modulation and coding scheme (MCS) for transmitting data frames to be received; a processing system configured to determine a link margin based on the MCS; and a transmitter configured to transmit, via the at least one antenna, a response message with an indication of the link margin.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 4 illustrates a table of device modes for television white space (TVWS) as defined by the Federal Communications Commission (FCC), in accordance with certain aspects of the present disclosure.

DETAILED DESCRIPTION

Figure 1:
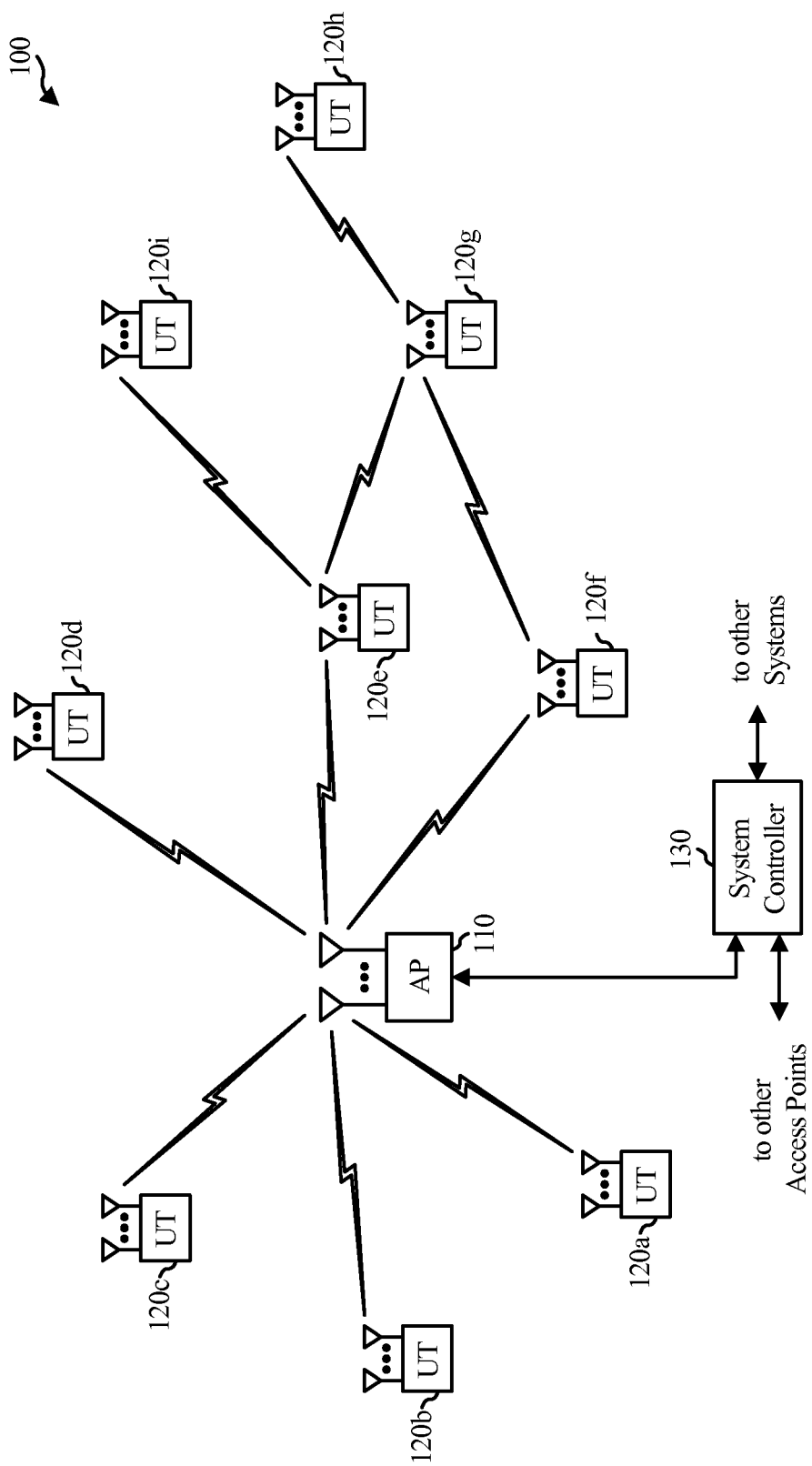
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to a different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station ("MS"), a remote station, a remote terminal, a user terminal ("UT"), a user agent, a user device, user equipment ("UE"), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
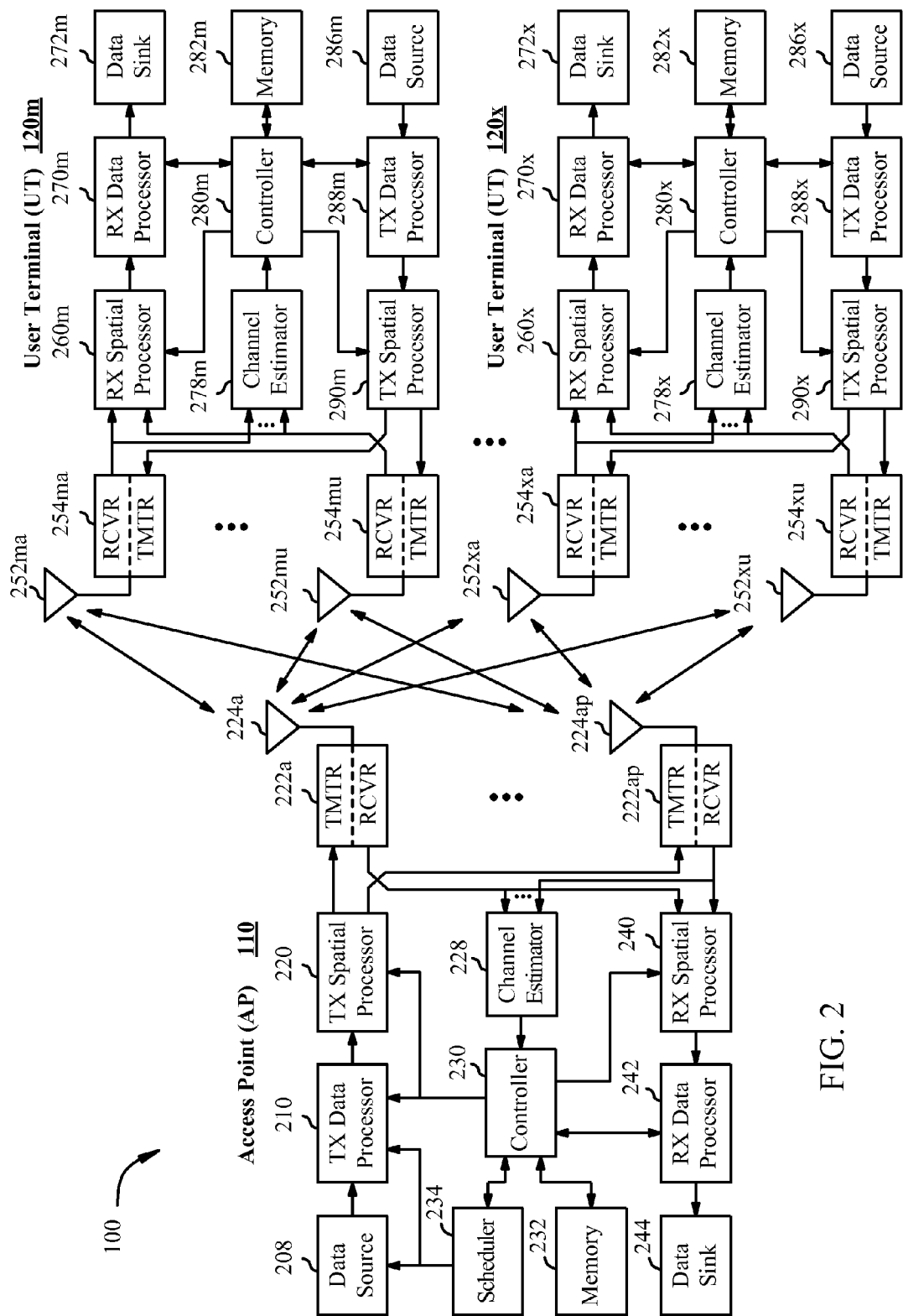
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
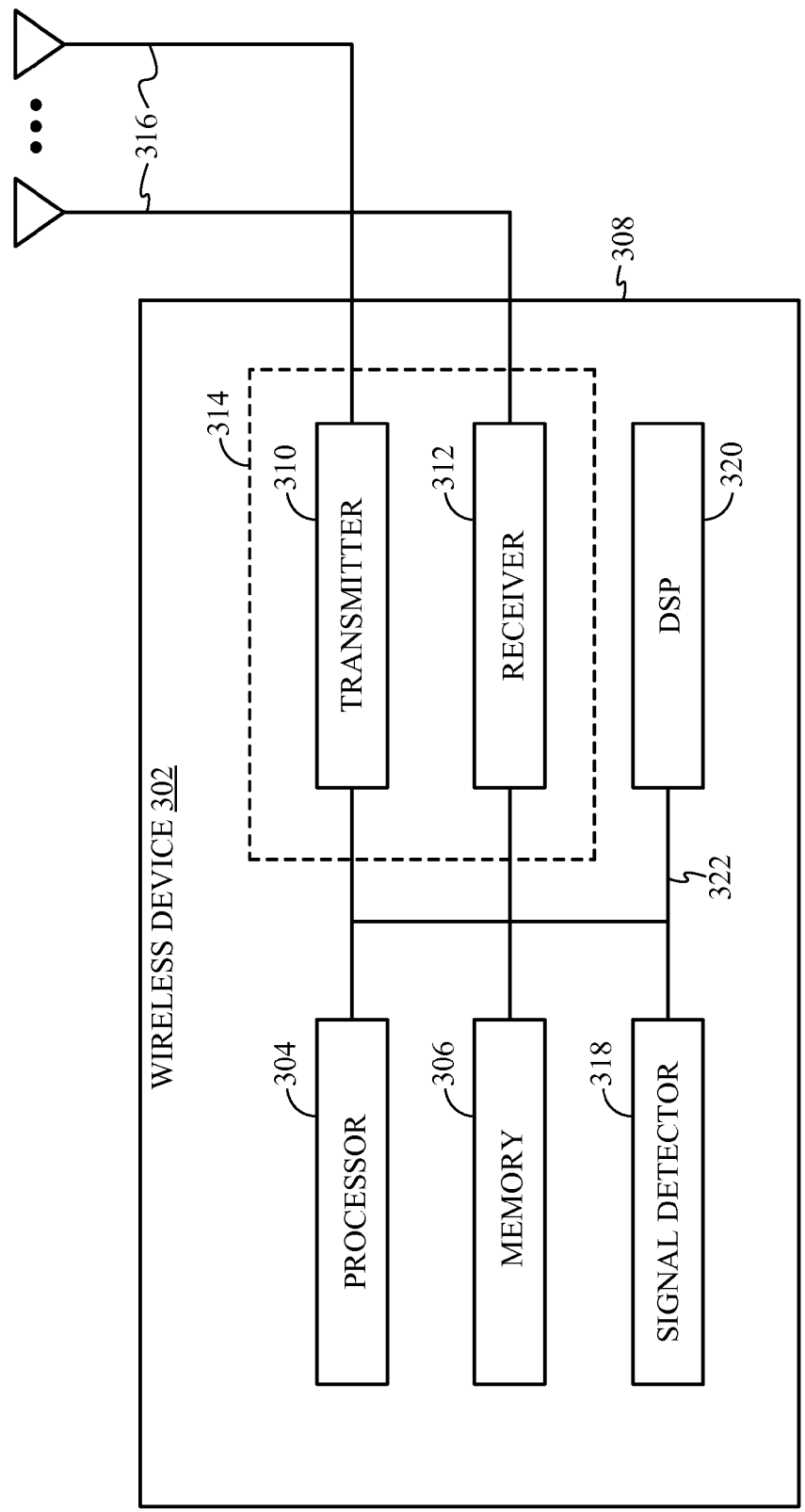
FIG. 3 illustrates a block diagram of an example wireless device in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

CSMA Operation in TVWS

As described above, IEEE 802.11af is an extension of the IEEE 802.11 standard into the TV white space. As used herein, the term "white space" generally refers to unused frequencies in the electromagnetic spectrum, and the term "TV white space" generally refers to the unused frequency spectrum in the TV band (e.g., the radio frequencies historically allocated for analog television, but now available due to the conversion to digital television). No physical (PHY)/MAC (media access control) layer changes are being considered in this extension. Several frame formats are added for the enablement procedure.

FIG. 4 illustrates a table 400 of device modes for television white space (TVWS) as defined by the Federal Communications Commission (FCC). TVWS devices include fixed devices, which may most likely be installed by a professional and have the locations of the individual devices entered into a database. The maximum transmit power for fixed devices is 36 dBm. Mobile/portable TVWS devices include Mode 1 and Mode 2 devices, whose locations are not registered. The maximum transmit power for portable devices is 20 dBm. Fixed and Mode 2 devices are termed enabling stations (STAs), while a device in a Mode 1 operational state is termed a dependent STA. Although transmit power control is not required in the IEEE 802.11 standard, the FCC recommends (or may even mandate) using transmit power control in the TVWS.

Once devices are enabled, the devices are expected to use Carrier Sense Multiple Access (CSMA) MAC for communication. However, a number of problems are expected when using CSMA in the TVWS. For example, larger propagation range available with TVWS increases the likelihood of hidden nodes and increases the number of contending nodes. CSMA performance is sensitive to the presence of hidden nodes and the number of contending nodes. Another problem is diversity in transmit powers due to fixed and portable devices using different transmit powers and to the utilization of transmit power control. Such diversity causes asymmetry in the coverage areas of different transmitters, leading not only to the increased possibility of hidden or exposed nodes, but also to increased collisions and unfair access.

Accordingly, what is needed are techniques and apparatus for improved CSMA operation between fixed and portable devices in an effort to at least alleviate, if not completely solve, these problems.

Transmit Power Management in TVWS

The difference in transmit power between fixed and portable devices is substantial. The range of fixed devices is larger than that of portable devices. For example, there is a 10 dBm link budget difference between the range at which a portable device hears a fixed device and the range at which a fixed device hears a portable device.

Figure 5:
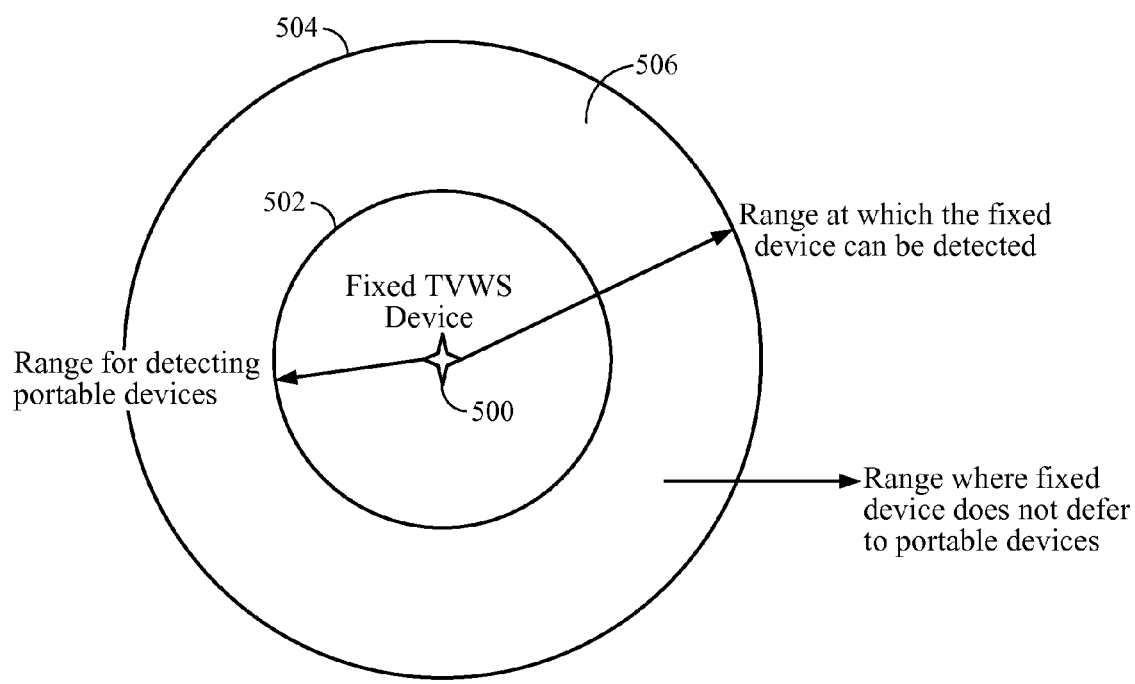
FIG. 5 illustrates different ranges at which a fixed device may be detected and may detect portable devices, in accordance with certain aspects of the present disclosure.

FIG. 5 illustrates a fixed TVWS device 500, such as an access point (AP) 110. The inner circle 502 represents a range at which the fixed device 500 can detect portable devices, whereas the outer circle 504 represents the range at which the fixed device 500 can be detected. The radius of the inner circle 502 is approximately half the radius of the outer circle 504. The area between the inner circle 502 and the outer circle 504 represents a region 506 where the fixed device 500 does not defer to portable devices.

To allow for co-existence of fixed and portable devices, portable devices may most likely use a channel that has a neighboring fixed device only if the fixed device is sufficiently close to hear the portable device. To determine interfering fixed devices, a report element the same as, or at least similar to, a transmit power control (TPC) report element in IEEE 802.11 may be used.

Figure 6:
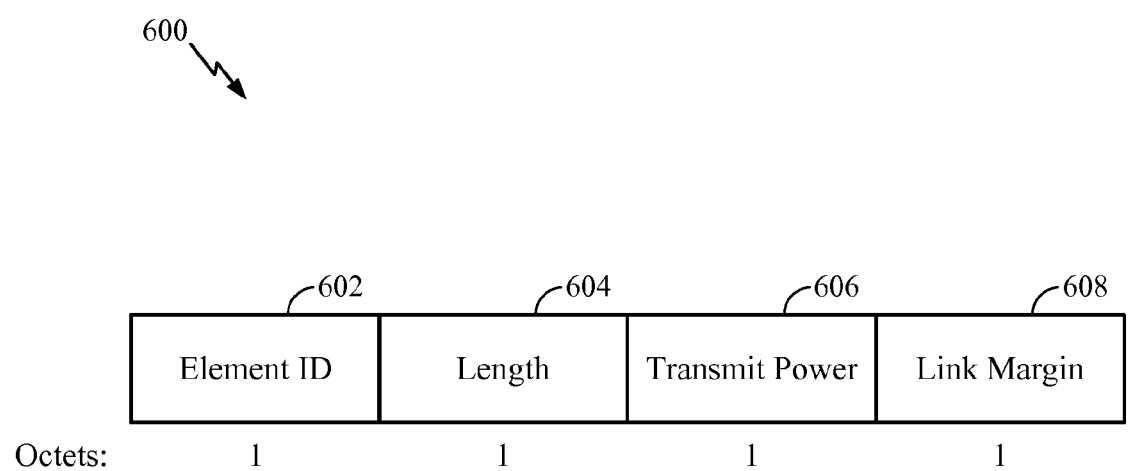
FIG. 6 illustrates a transmit power control (TPC) report element in accordance with certain aspects of the present disclosure.

FIG. 6 illustrates a TPC report element 600, in accordance with certain aspects of the present disclosure. The TPC report element 600 may comprise an element identification (ID) field 602, a length field 604, a transmit power field 606, and a link margin field 608. Each of these fields 602-608 may have a length of one octet (8 bits).

For certain aspects, portable devices may implement a two-step procedure to determine interfering fixed devices. First, a portable device may identify high transmit power fixed devices by monitoring the TPC element in the beacons received. Next, the portable device may send a probe request with a wild card service set identifier (SSID) and a TPC request. This request may be sent at the lowest PHY rate. Response TPC elements from fixed devices may most likely contain the link margin based on the TPC request. As used herein, the "link margin" generally refers to the difference between a wireless receiver's sensitivity and the actual received power, typically measured in decibels (dB). The portable device may use the link margin to determine transmit power to ensure that transmissions from the portable devices are "heard" at fixed devices. If several fixed devices do not respond to the TPC request, the portable device may assume that the portable device itself is "hidden" from such fixed devices and may move to another channel. This two-step procedure may entail a standards change to ensure that a TPC response to TPC requests with a wild card SSID is mandatory.

For certain aspects, an alternate procedure may be used to determine interfering fixed devices, which need not entail a standards change. In this alternate procedure, a sequence of request-to-send (RTS) messages may be sent at increasing powers to each of the identified high transmit power fixed devices, and the minimum power level involved for a clear-to-send (CTS) response may be determined. If several fixed devices do not respond to the RTS messages, even at the highest power, the portable device may most likely assume that the device itself is "hidden" from such fixed devices and move to another channel.

Because fixed devices may typically be designed to register their location and utilized channel, a database may aid in the discovery of fixed devices. Portable devices may most likely be capable of querying for the fixed devices in the vicinity of the portable devices. For example, a portable device may be able to obtain a list of fixed devices in a 200 m radius from the portable device's location. A response from the database may include the locations, operating channels, and transmit power levels of the fixed devices.

Figure 7:
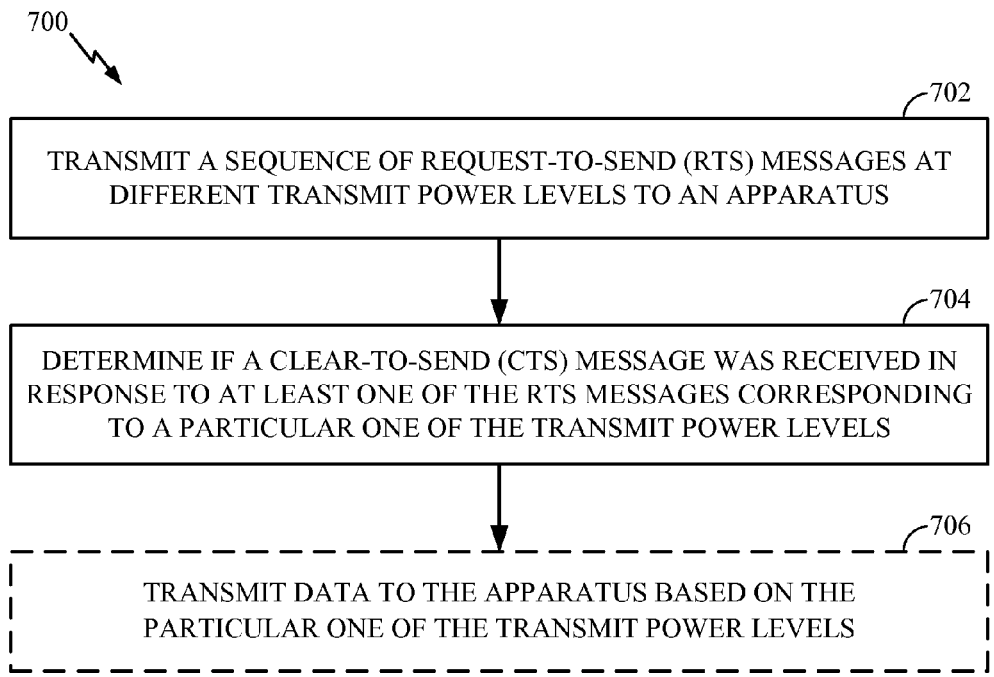
FIG. 7 illustrates example operations to determine, from the perspective of a portable device, interfering fixed devices using a sequence of messages sent at different transmit power levels, in accordance with certain aspects of the present disclosure.

FIG. 7 illustrates example operations 700 to determine, from the perspective of a portable device, for example, interfering fixed devices using a sequence of messages sent at different transmit power levels, in accordance with certain aspects of the present disclosure. The operations may begin, at 702, with the portable device transmitting a sequence of request-to-send (RTS) messages at different power levels to an apparatus, such as a fixed TVWS device. For certain aspects, the sequence of RTS messages may comprise RTS messages transmitted with increasing power. The portable device may transmit the sequence of RTS messages via one or more channels in the TVWS.

At 704, the portable device may determine if a clear-to-send (CTS) message was received in response to at least one of the RTS messages corresponding to a particular one of the transmit power levels. For certain aspects, the portable device may transmit at least one of data, a subsequent RTS message, or a subsequent CTS message at 706 to the apparatus, based on the particular one of the transmit power levels. For certain aspects, the particular one of the transmit power levels is a minimum transmit power level for transmitting one of the RTS messages to the apparatus and for receiving the CTS message in response.

According to certain aspects, the portable device may identify the apparatus. The apparatus may identify the apparatus by sending a query about any fixed apparatuses nearby (i.e., in a vicinity of the portable device) and receiving a response to the query. The response may include at least one of a location of the fixed apparatus, an operating channel for the fixed apparatus, or a transmit power level of the fixed apparatus.

For certain aspects, the portable device may transmit the sequence of RTS messages using a first channel. If the CTS message is not received, the portable device may transmit the sequence of RTS messages using a second channel, different than the first channel.

When transmit devices use transmit power control, larger medium re-use and decreased contention may result if the range of individual transmit devices is small. However, diversity in transmit powers may cause hidden node problems with higher collision probability and/or unfair medium access for devices that use lower power when neighboring devices use higher power. Therefore, the transmit power used may most likely be high enough to ensure the highest possible modulation and coding scheme (MCS) is received. This may lead to carrier sense at potentially interfering neighbors.

Figure 8:
FIG. 8 illustrates an example hidden node problem in accordance with certain aspects of the present disclosure.

FIG. 8 illustrates an example hidden node problem in accordance with certain aspects of the present disclosure. In FIG. 8, node A transmits at a lower power than node C. Node C does not defer to transmissions of node A, thereby causing collisions at node B. In order to solve this problem, packet-drop-based rate adaptation may involve a transmit power increase at the transmitter side. The transmit power may be increased to a level to force deferral at node C. If RTS/CTS is used, node B may adjust the power of the CTS to ensure that node B's interfering neighbors are quiet as another solution to this problem at the receiver side. These solutions may also be combined. Methods for identifying interfering neighbors are described below.

Figure 9:
FIG. 9 illustrates an example exposed node problem in accordance with certain aspects of the present disclosure.

FIG. 9 illustrates an example exposed node problem with transmit power control in accordance with certain aspects of the present disclosure. If node A has a lower transmit power than node C such that node A defers to node C, but node C does not defer to node A, then medium access at node A would be lower than that at node C. If transmissions of node A are received at node B, then there are no collisions to trigger a power increase at node A. To ensure fair access, node A may most likely be able to determine if node A's lower access is due to a few nodes that do not defer to node A or due to a network with many nodes. This may entail a method to identify neighbors that cause deferral at node A, although decoding of the transmissions to determine MAC addresses may not be feasible. If the neighbors can be identified, then node A may ramp up node A's transmit power to force deferral at node A's neighbors.

Figure 10:
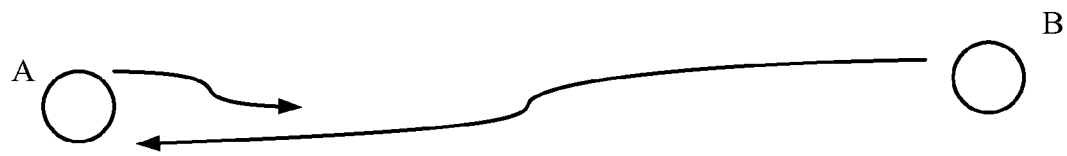
FIG. 10 illustrates a node causing interference and deferral to a neighboring node in accordance with certain aspects of the present disclosure.

FIG. 10 illustrates a node causing interference and deferral to a neighboring node in accordance with certain aspects of the present disclosure. In FIG. 10 transmissions from node B cause deferral at node A. In order to discover neighbors that cause interference and deferral, two different cases may be considered. In the first case, node A is able to decode packets from node B. Therefore, node A may send a TPC request to node B to determine the transmit power of node B. Node A may then use sufficient power to ensure deferral at node B.

In the second case, node A cannot decode packets from node B (e.g., due to the MCS used). Accordingly, what is needed is a method for node A to be able to determine its potential neighbors and then transmit at a suitable power level.

Figure 11:
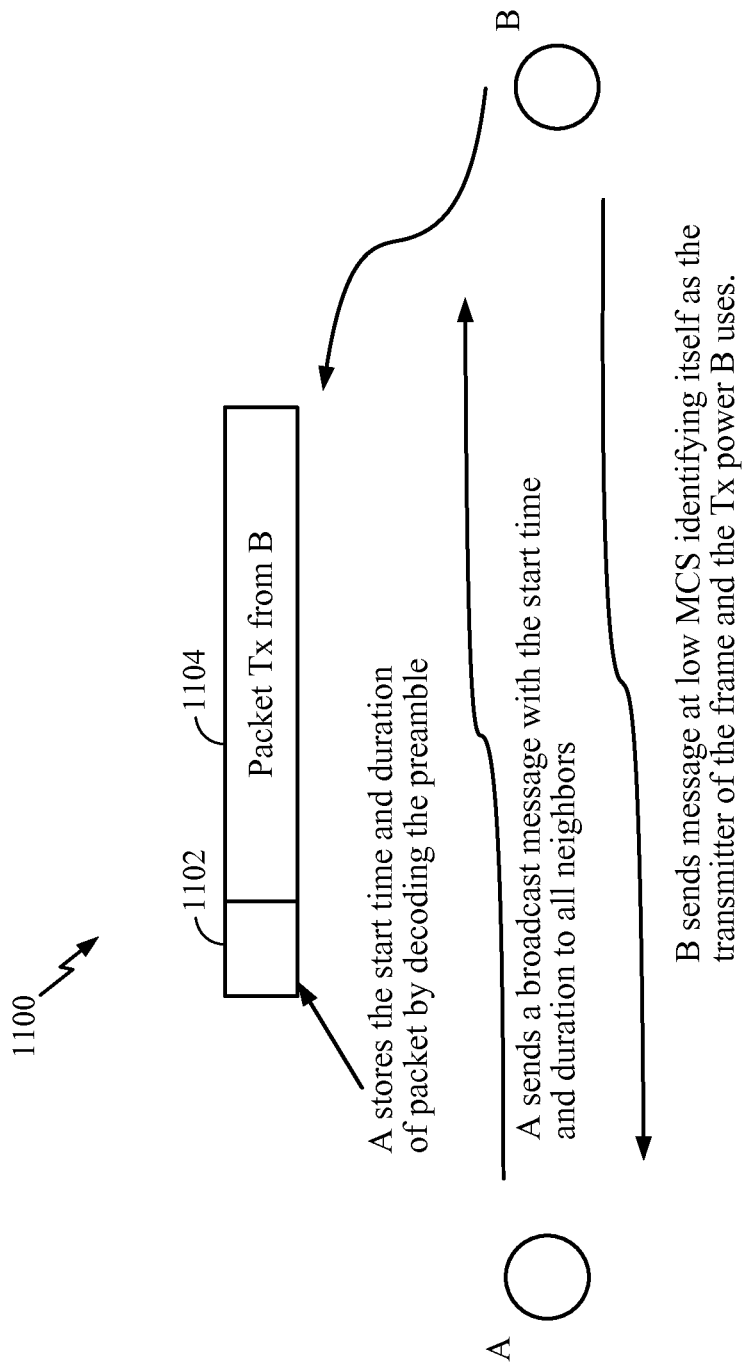
FIG. 11 illustrates using a start time of a packet to force identification of an unknown node, in accordance with certain aspects of the present disclosure.

FIG. 11 illustrates using a start time of a packet 1100 having a preamble 1102 and a payload 1104 to force identification of an unknown node, in accordance with certain aspects of the present disclosure. In this manner, neighbor discovery may be accomplished based on the packet start time. When node A defers to a transmission from an unknown node, node A decodes the preamble 1102 and records the exact time at which the node received the preamble. Node A then sends a query with a broadcast receive address and the time stamp (relative to the transmit time of the packet that caused deferral). For certain aspects, time stamps for several packets in the past may be included in an effort to discover multiple neighbors.

STAs (such as node B) may receive the query check if the STAs had transmitted a packet at the time provided in the query message. If the time stamp in the query matches the transmit time at one of the STAs, this STA sends a response message to node A. The response message may include a TPC element providing link margin information to node A. Based on the link margin, node A may then determine a suitable power level to ensure deferral at node B and that a CTS sent by node A is received at node B. Suitable transmit power may also computed by sending a sequence of RTSs and increasing power levels until a CTS is received from a STA, such as node B, as described above.

Figure 12:
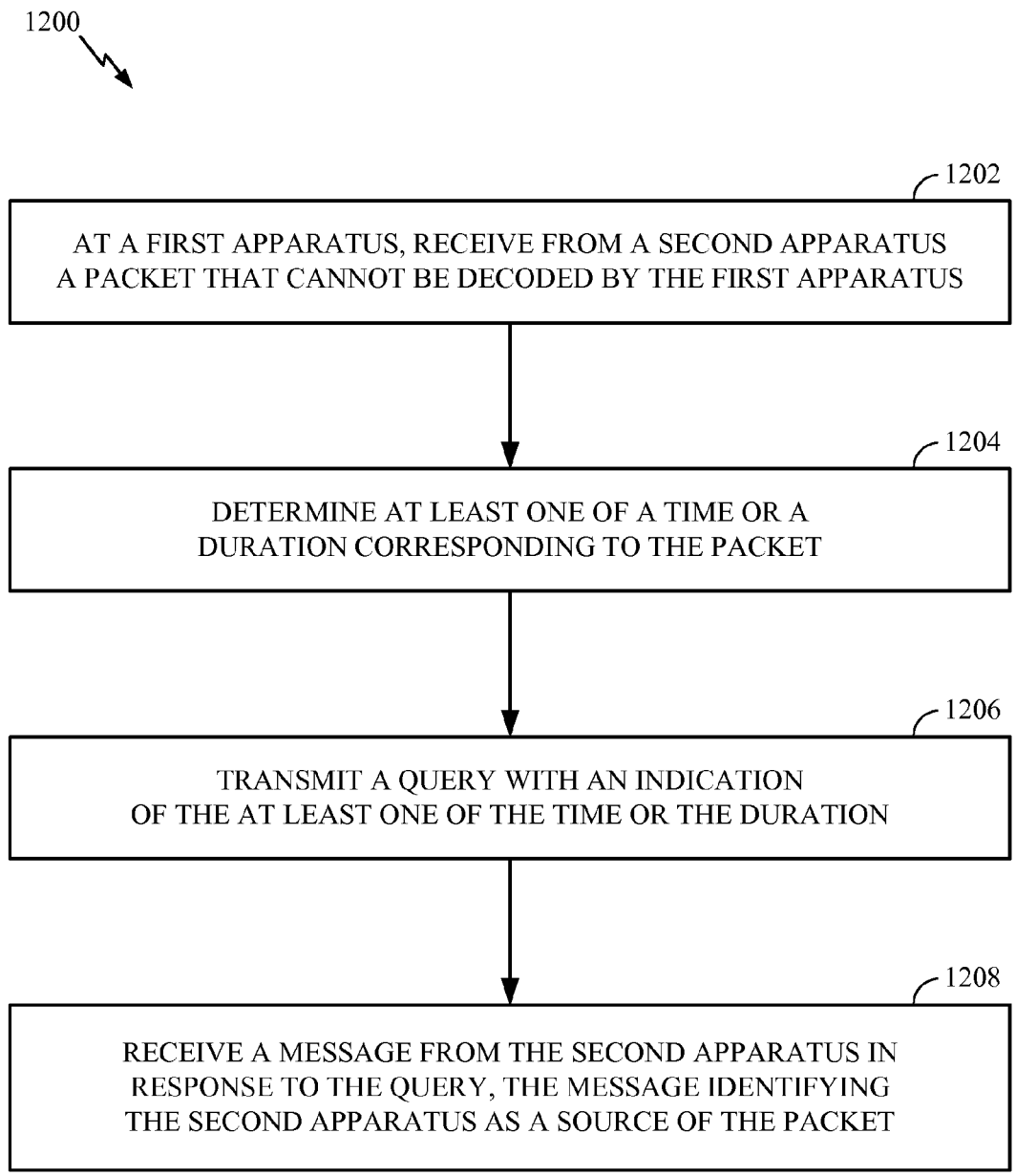
FIG. 12 illustrates example operations to learn, from the perspective of a wireless node, the transmit power used by an unknown neighboring node, in accordance with certain aspects of the present disclosure.
Figure 12A:
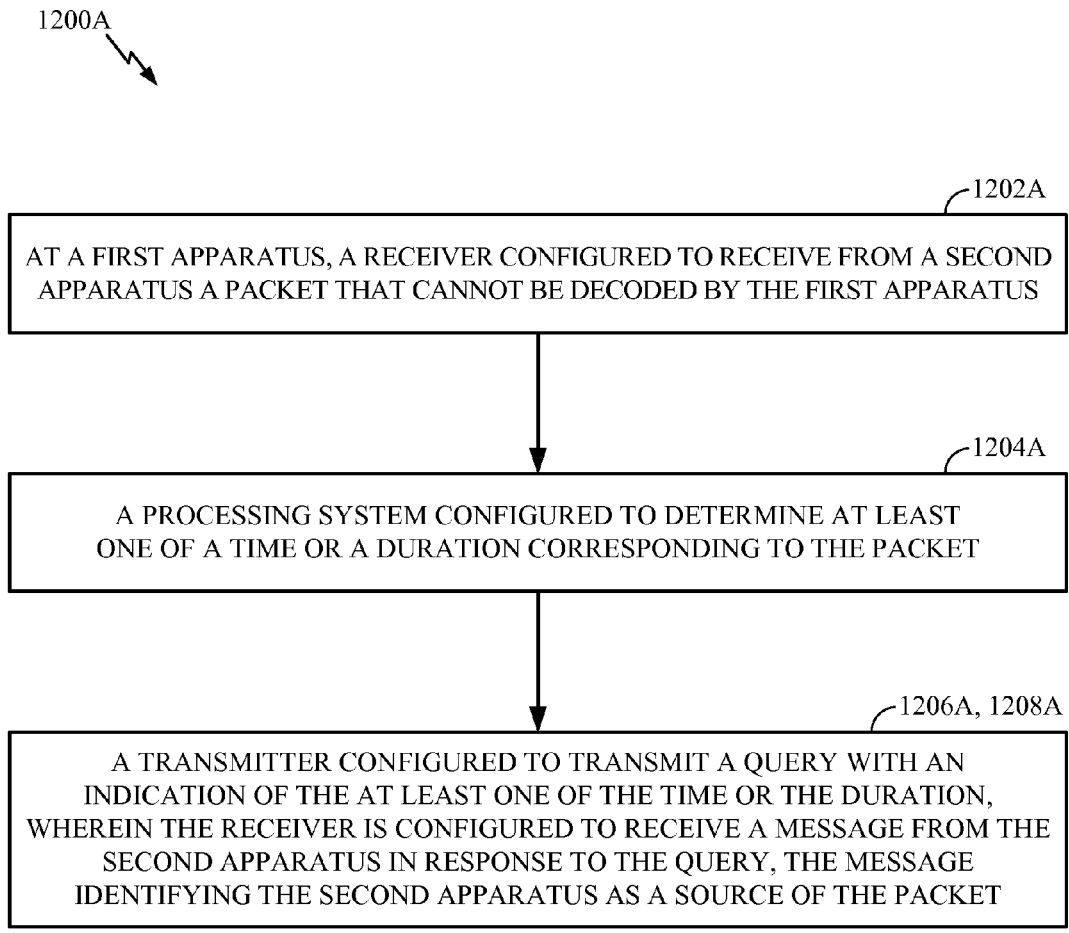
FIG. 12A illustrates example components for performing the operations shown in FIG. 12.

FIG. 12 illustrates example operations 1200 to learn, from the perspective of a wireless node, for example, the transmit power used by an unknown neighboring node, in accordance with certain aspects of the present disclosure. The operations 1200 may begin, at 1202, by receiving, at a first apparatus from a second apparatus, a packet that cannot be decoded by the first apparatus. At 1204, the first apparatus may determine at least one of a time or a duration corresponding to the packet. The first apparatus may transmit a query with an indication of the at least one of the time or the duration at 1206. For certain aspects, the query may be transmitted via one or more channels in the TVWS. At 1208, the first apparatus may receive a message from the second apparatus in response to the query, the message identifying the second apparatus as a source of the packet. For certain aspects, the message indicates a power used by the second apparatus to transmit the message.

According to certain aspects, the first apparatus may transmit a sequence of request-to-send (RTS) messages at different transmit power levels to the second apparatus. The first apparatus may determine if a clear-to-send (CTS) message was received in response to at least one of the RTS messages corresponding to a particular one of the transmit power levels. For certain aspects, the transmit power levels may be increasing in the sequence of RTS messages. The particular one of the transmit power levels may comprise a minimum transmit power level for transmitting one of the RTS messages to the second apparatus and for receiving the CTS message in response. The first apparatus may transmit at least one of data, a subsequent RTS message, or a subsequent CTS message to the second apparatus based on the particular one of the transmit power levels.

For certain aspects, the first apparatus may transmit a request to the second apparatus and may receive a response from the second apparatus indicating a link margin based on the request. The first apparatus may transmit data to the second apparatus based on the link margin.

Figure 13:
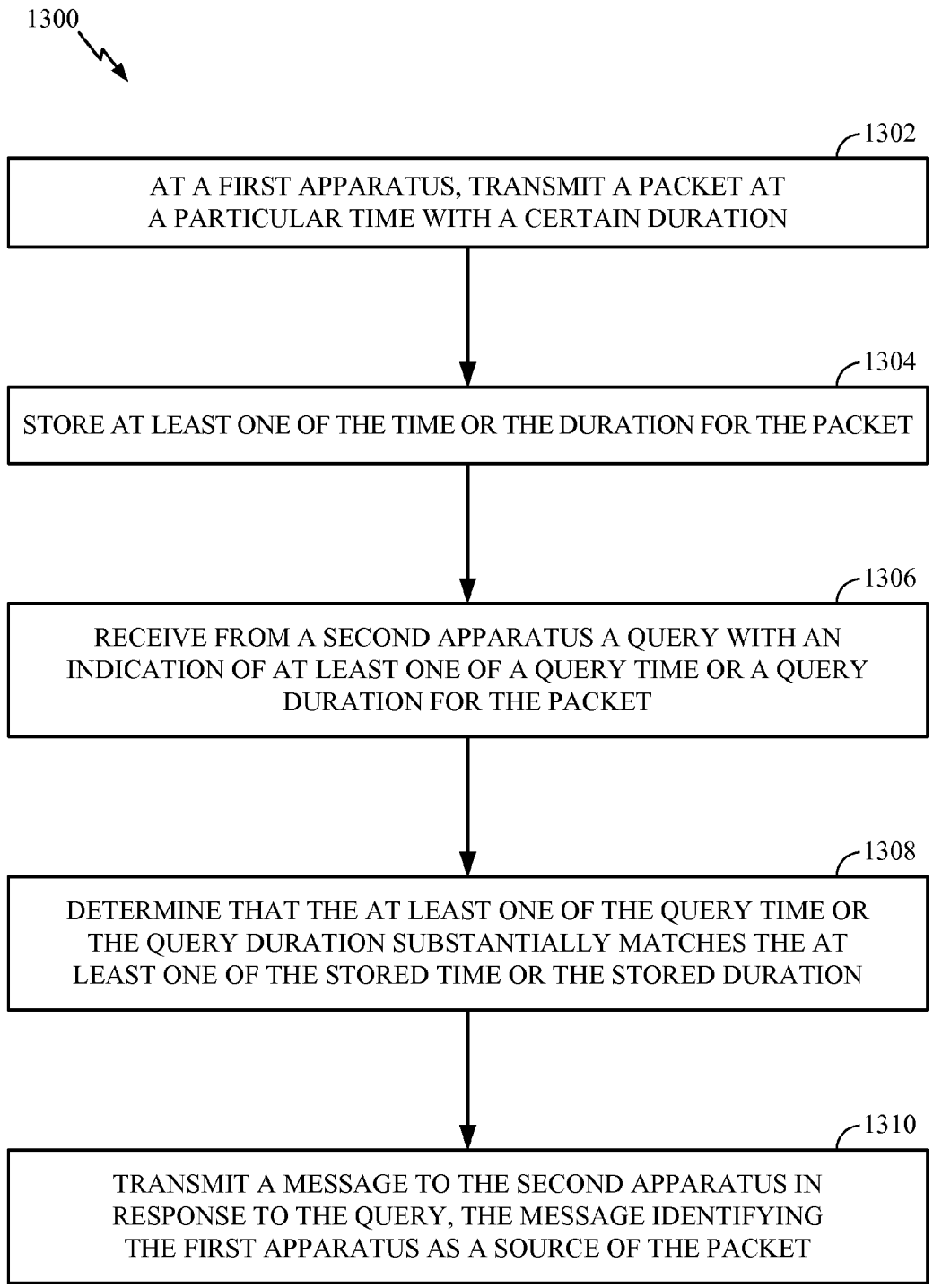
FIG. 13 illustrates example operations to provide, from the perspective of a wireless node unknown to a neighboring node, the transmit power used by the wireless node, in accordance with certain aspects of the present disclosure.
Figure 13A:
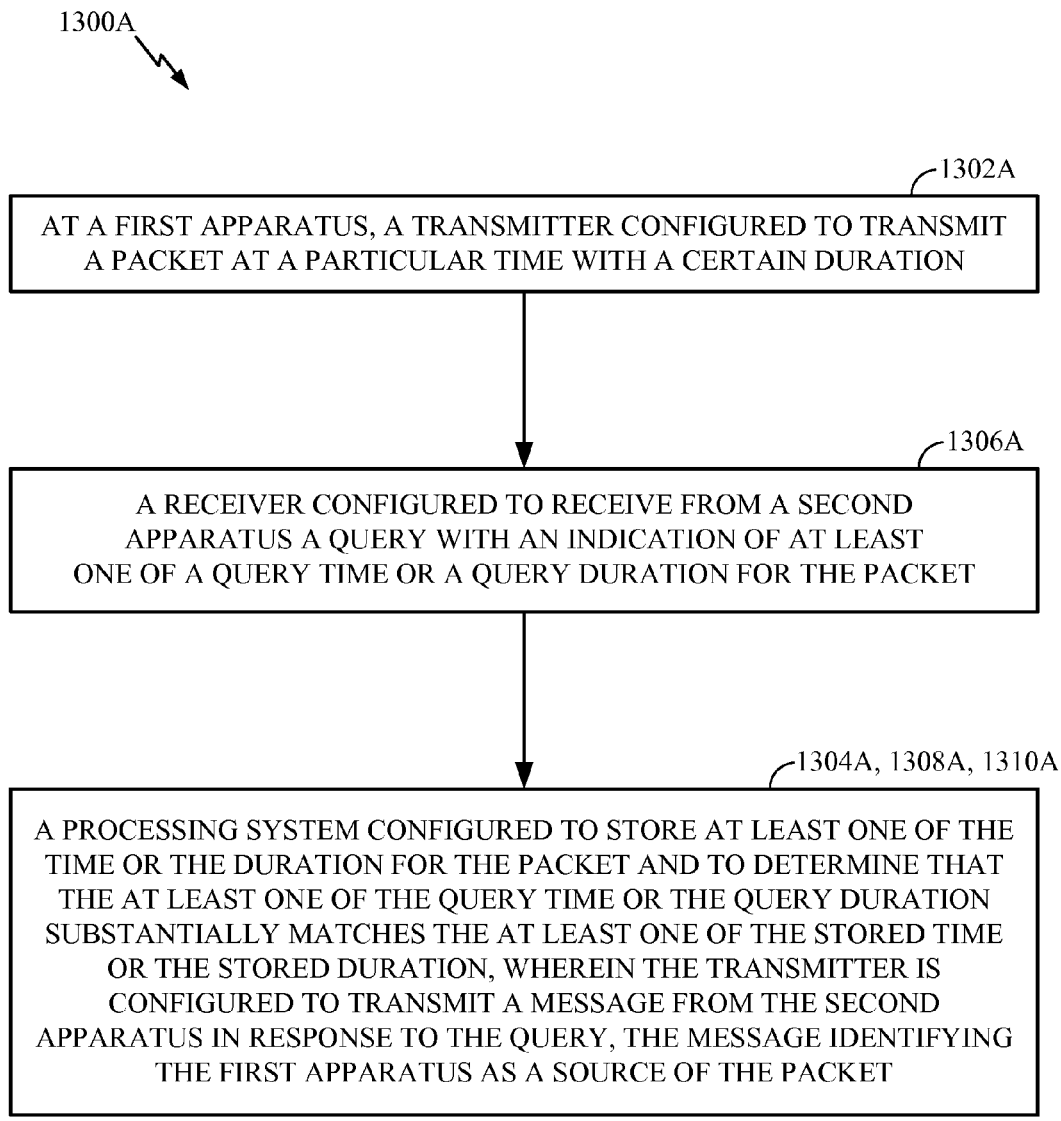
FIG. 13A illustrates example components for performing the operations shown in FIG. 13.

FIG. 13 illustrates example operations 1300 to provide, from the perspective of a wireless node unknown to a neighboring node, for example, the transmit power used by the wireless node, in accordance with certain aspects of the present disclosure. The operations 1300 may begin, at 1302, with the first apparatus transmitting a packet at a particular time with a certain duration. At 1304, the first apparatus may store at least one of the time or the duration for the packet. The first apparatus may receive from a second apparatus a (broadcast) query with an indication of at least one of a query time or a query duration for the packet at 1306. For certain aspects, the first apparatus may receive the query via one or more channels in the TVWS. At 1308, the first apparatus may determine that the at least one of the query time or the query duration substantially matches the at least one of the stored time or the stored duration. At 1310, the first apparatus may transmit a message to the second apparatus in response to the query, the message identifying the first apparatus as a source of the packet. For certain aspects, the message may indicate a power used by the first apparatus to transmit the message.

According to certain aspects, the first apparatus may receive a request-to-send (RTS) message from the second apparatus. The first apparatus may transmit a clear-to-send (CTS) message in response to the RTS message.

For certain aspects, the first apparatus may receive a request from the second apparatus. The first apparatus transmit a response to the second apparatus indicating a link margin based on the request. The request may comprise a transmit power control (TPC) request, and the response may comprise a TPC response.

As described above, using a high transmit power causes CSMA deferral over a larger area due to the lower path loss in the TVWS band. Deferral over large areas limits spatial re-use. Therefore, one object of aspects of the present disclosure is to increase spatial re-use of TVWS channels. This may be accomplished by an intelligent reduction of transmit power of RTS, CTS, and data. Naïve reduction of transmit power is not sufficient because if the transmit power is too low, the receiving STA may likely see interference from a large number of "hidden nodes," thus preventing reception. However, high transmit powers may be "overkill" in many scenarios, leading to wasted battery power, for example.

Accordingly, what is needed are techniques and apparatus to adjust data transmit power to ensure reception at the intended PHY rate at the receiver and to adjust CTS power to cause deferral only at selected interferers. Ideally, implementations would involve only minimal changes to the IEEE 802.11 standard.

Transmit power adaptation may be accomplished for the RTS, the CTS, and/or data. Transmit power determination for the RTS/data may involve a method for a receiver-side (Rx-side) device to determine and convey a transmitter-side (Tx-side) transmit power. This transmit power determination may use request response messages similar to current TPC messages, described below. Transmit power determination for CTS may entail a method to calculate the CTS transmit power sufficient to block out dominant interferers. Beacons and RTSs may be augmented with data transmit power information as described below. Transmit power determination for CTS may involve a method for a STA to identify interferers to quiet with the CTS and send CTS with sufficient transmit power to reach those interferers.

A TPC request/response mechanism has been defined in IEEE 802.11. This mechanism allows transmitter/receiver pairs to determine a suitable transmit power.

Figure 14A:
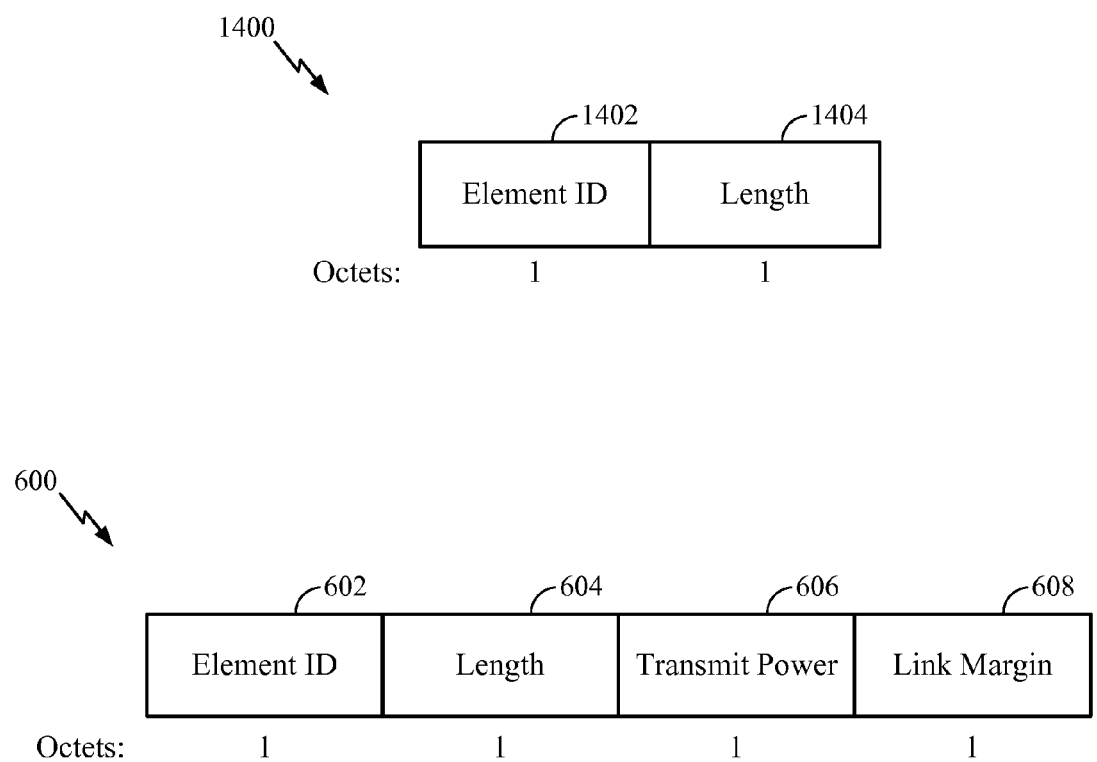
FIG. 14A illustrates a TPC request element and a TPC report element, in accordance with certain aspects of the present disclosure.

FIG. 14A illustrates a TPC request element 1400 and a TPC report element 600, in accordance with certain aspects of the present disclosure. The TPC request element 1400 may comprise an element ID field 1402 and a length field 1404. Each of these fields 1402, 1404 may have a length of one octet (eight bits).

For RTS or data transmit power determination, the Tx-side device may send a TPC request message to the Rx-side device. The Rx-side device may respond with a TPC report message that contains a link margin field 608. The link margin may be measured during the reception of the corresponding TPC request. The transmit power field 606 may indicate a transmit power of the TPC report message. The Tx-side device may determine the indicated transmit power from the link margin indicated in the TPC report message.

Figure 14B:
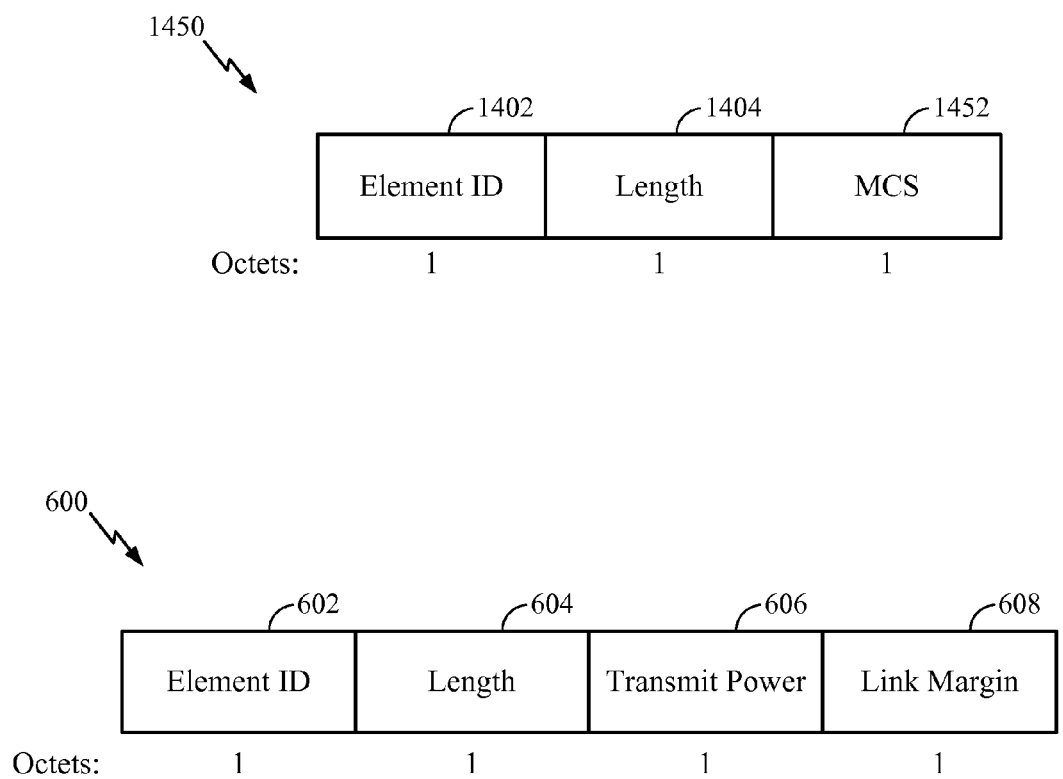
FIG. 14B illustrates a TPC request element with a modulation and coding scheme (MCS) field and a TPC report element, in accordance with certain aspects of the present disclosure.

FIG. 14B illustrates a TPC request element 1450 with a modulation and coding scheme (MCS) field 1452 and a TPC report element 600, in accordance with certain aspects of the present disclosure. In order to enable the Tx-side device to request the power level desired for reception at a given MCS from an Rx-side device, the Rx-side device should be able to provide a transmit power that is based on the path loss to the Tx-side device and potential interference at the Rx-side device. To accomplish this, the Tx-side device may send a request message with the desired transmit MCS. The Rx-side device may compute a power margin $M_1$ that may most likely be applied to the transmit power of the request message to support the requested MCS based on the received power (e.g., the RSSI, or received signal strength indicator) of the request message. The Rx-side device may adjust (e.g., reduce) the computed power margin $M_1$ in the above step by a further factor (e.g., a factor of tolerable interference) to obtain the feedback link margin $M_2$. Any suitable method of determining the tolerable interference factor may be employed. The Rx-side device may then send a message with the margin $M_2$ to the Tx-side device. The Tx-side device may apply the fed-back margin $M_2$ to the transmit power used for the request message to determine the power to be used for data transmissions at the requested MCS.

For certain aspects, the Tx-side device may send a TPC request element 1450 with the MCS field 1452. The Rx-side device may respond with a TPC report element 600 with the link margin field 608 set according to the MCS, a path loss between the Rx-side device and the Tx-side device, and a desired signal-to-interference-plus-noise ratio (SINR) at the Rx side. Then, the Tx-side device may use the minimum transmit power indicated for the requested MCS based on the link margin returned.

Figure 15:
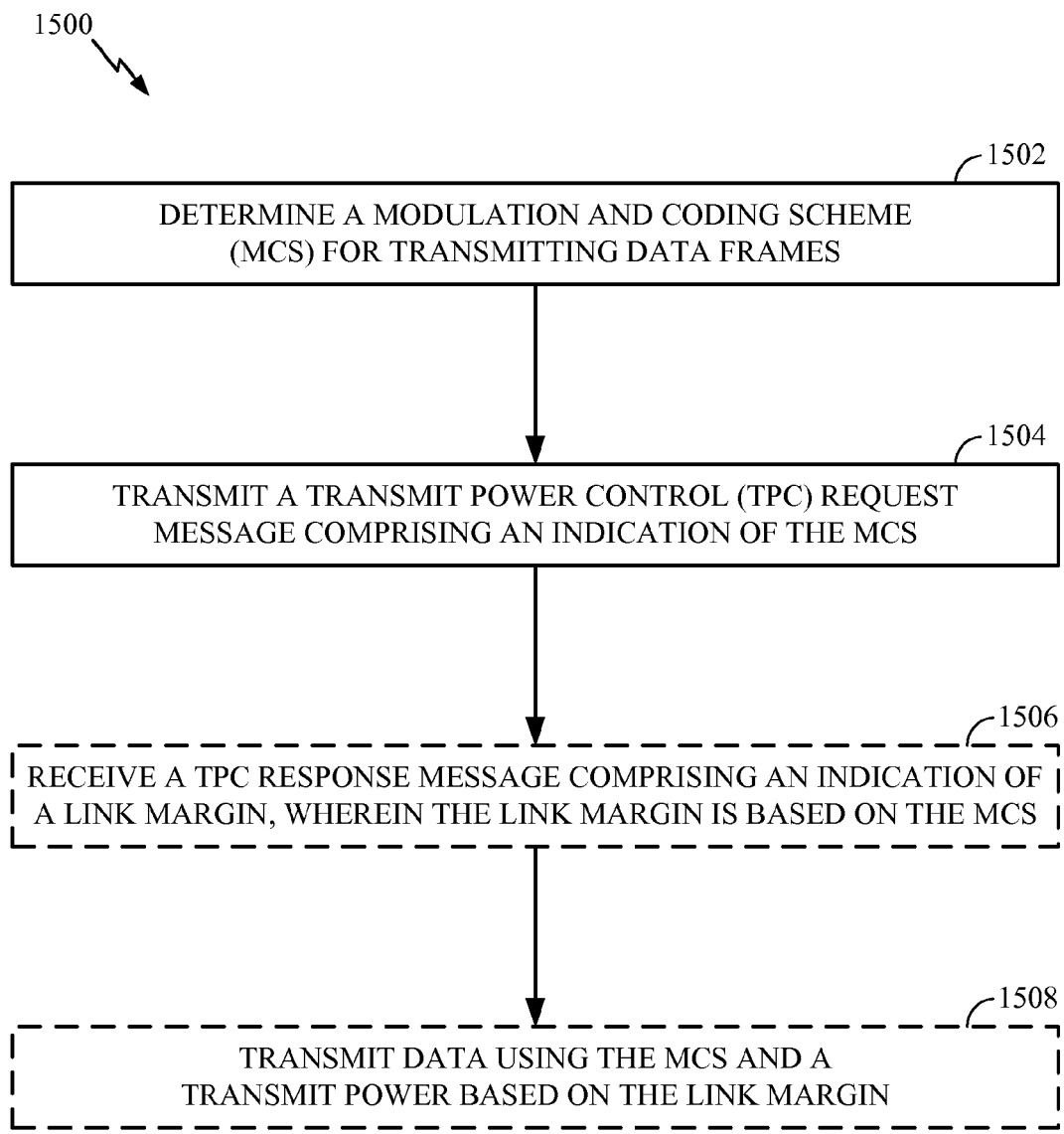
FIG. 15 illustrates example operations to utilize, from the perspective of a transmitter, a TPC request message with a desired MCS, in accordance with certain aspects of the present disclosure.
Figure 15A:
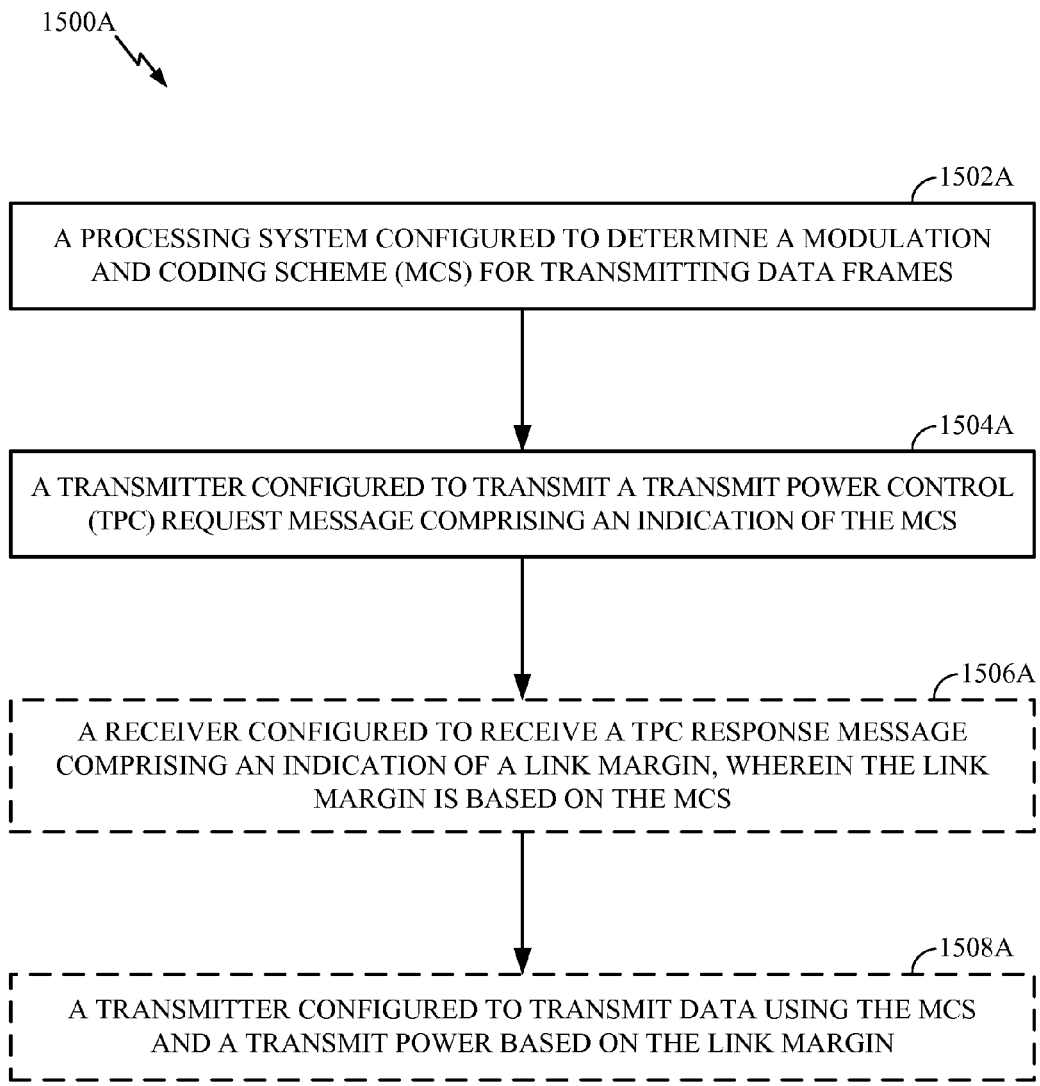
FIG. 15A illustrates example components for performing the operations shown in FIG. 15.

FIG. 15 illustrates example operations 1500 to utilize, from the perspective of a Tx-side device, for example, a TPC request message with a desired MCS, in accordance with certain aspects of the present disclosure. The operations 1500 may begin, at 1502, with the Tx-side device determining a MCS for transmitting data frames. At 1504, the Tx-side device may transmit a TPC request message comprising an indication of the MCS. The Tx-side device may transmit the TPC request message via one or more channels in a TVWS. For certain aspects, the indication of the MCS may comprise an IE in the request message. The Tx-side device may receive a TPC response message comprising an indication of a link margin, wherein the link margin is based on the MCS at 1506. At 1508, the Tx-side device may transmit data using the MCS and a transmit power based on the link margin.

Figure 16:
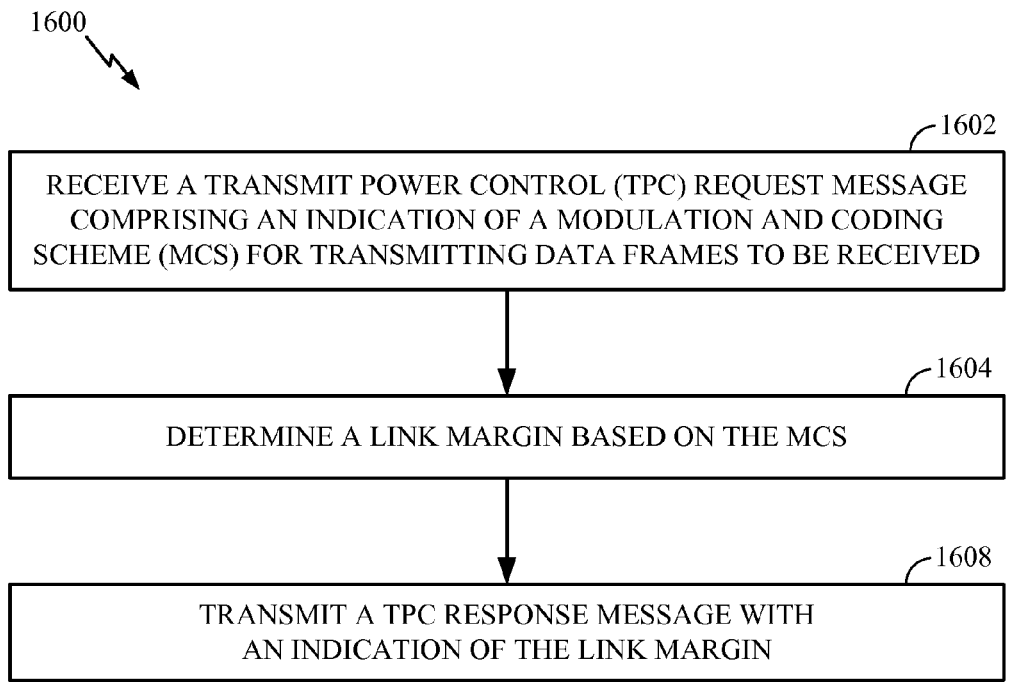
FIG. 16 illustrates example operations to utilize, from the perspective of a receiver, a TPC request message with a desired MCS, in accordance with certain aspects of the present disclosure.
Figure 16A:
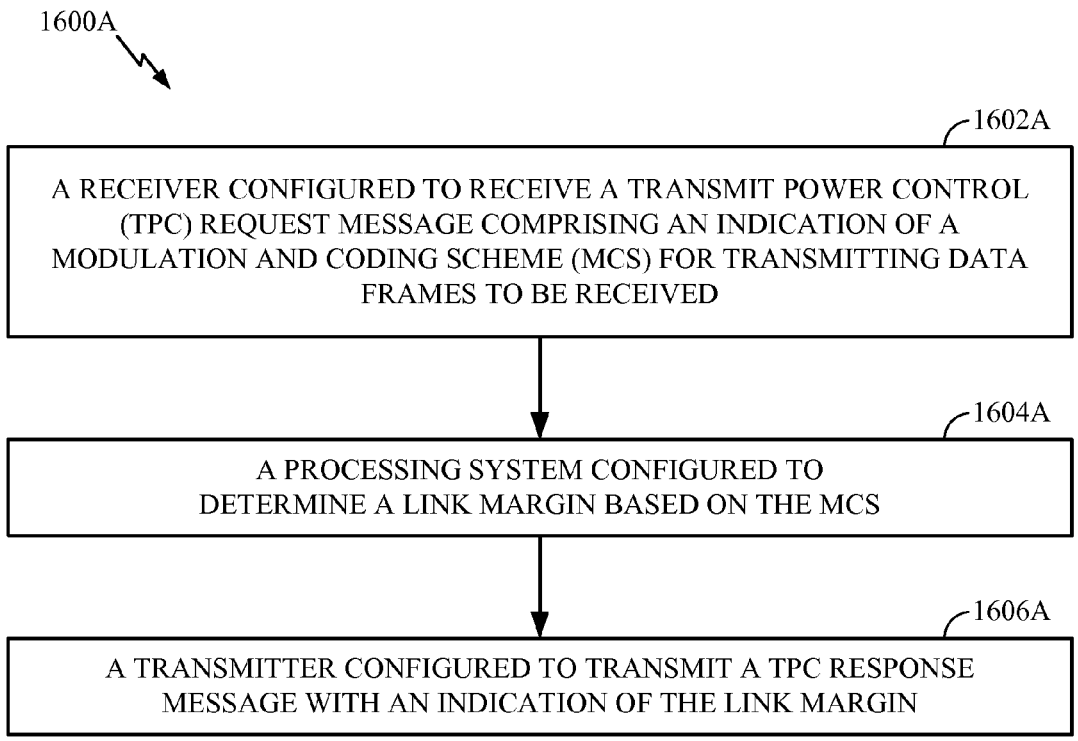
FIG. 16A illustrates example components for performing the operations shown in FIG. 16.

FIG. 16 illustrates example operations 1600 to utilize, from the perspective of a Rx-side device, for example, a TPC request message with a desired MCS, in accordance with certain aspects of the present disclosure. The operations 1600 may begin, at 1602, with the Rx-side device receiving a TPC request message comprising an indication of a MCS for transmitting data frames to be received. For certain aspects, the indication of the MCS may comprise an IE in the request message. At 1604, the Rx-side device may determine a link margin based on the MCS. The Rx-side device may transmit a TPC response message with an indication of the link margin at 1606. The Rx-side device may transmit the TPC response message via one or more channels in a TVWS.

According to certain aspects, the Rx-side device may determine a signal-to-interference-plus-noise ratio (SINR) and a path loss, wherein the link margin is based on the MCS, the SINR, and the path loss. The Rx-side device may determine a received power associated with the request message, determine a power margin based on the received power associated with the request message, and adjust the power margin by a factor to obtain the link margin. For certain aspects, the factor may be a tolerable interference factor.

Figure 17:
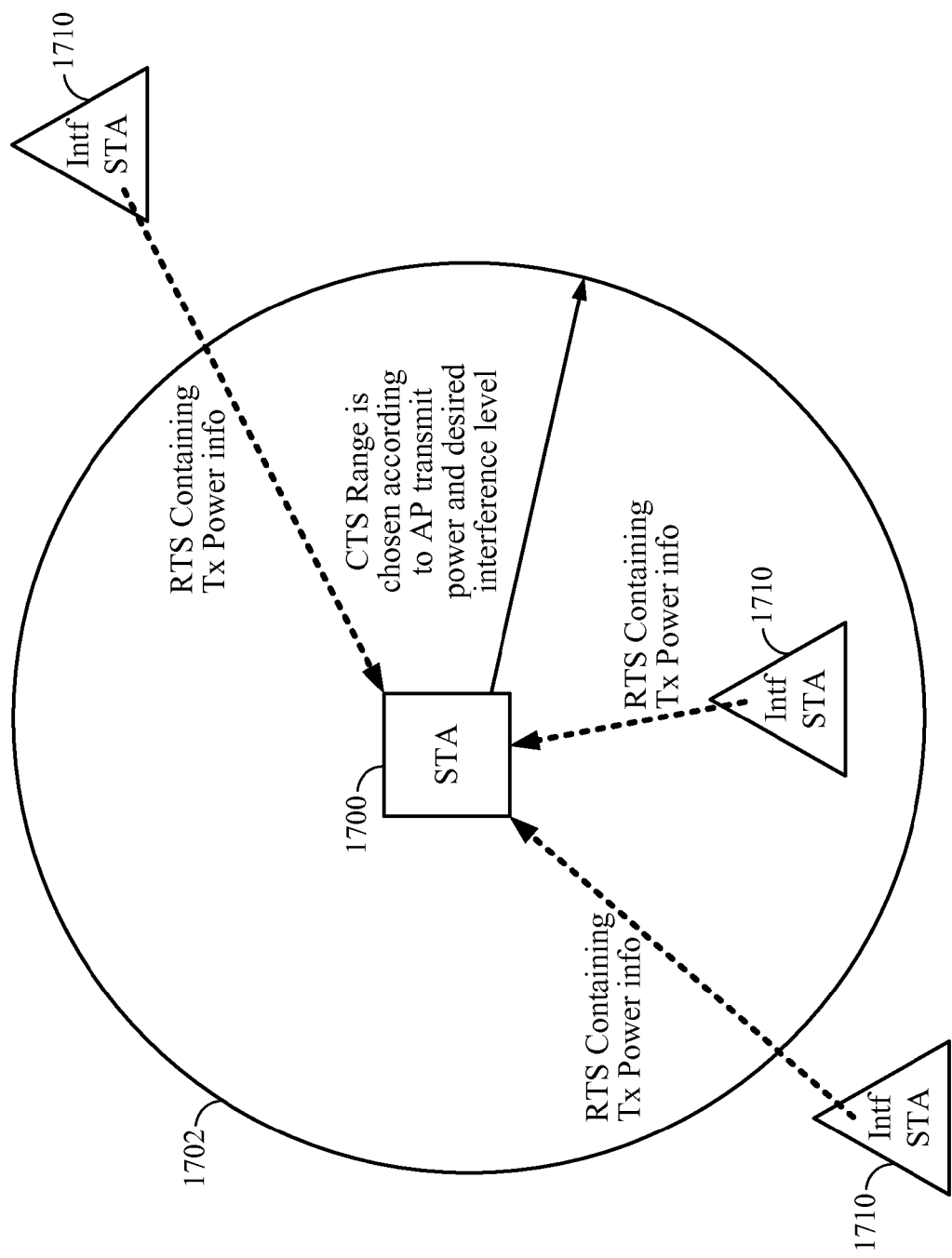
FIG. 17 illustrates an example station (STA) surrounded by interfering STAs, in accordance with certain aspects of the present disclosure.

FIG. 17 illustrates an example station (STA) 1700 surrounded by interfering STAs 1710, in accordance with certain aspects of the present disclosure. The CTS range 1702 of the STA 1700 is chosen according to AP transmit power and desired interference level.

In determining a transmit power for CTS messages, the Rx-side device (e.g., the STA 1700) may observe RTSs and beacons from neighboring interferers (e.g., interfering STAs 1710). Beacons of neighboring APs contain the maximum transmit power used by the AP to transmit data. For certain aspects, the beacons may contain the transmit power of the beacon, as well. Details for the beacon frame format are described below with respect to FIG. 18. Some RTSs transmitted from a STA are augmented with power used for the following data and the power used for transmitting the RTS. Details on augmented RTS frame format are provided below with respect to FIG. 21.

The Rx-side device may use data transmit power information along with path loss (determined from RSSI of the Beacon/RTS) to determine dominant interferers. The Rx-side device may send a CTS message at a power level sufficient to reach all the device's dominant interferers determined based on the data transmit power. Transmit power used for the beacon or augmented RTS may be larger in order to ensure decode at a longer range. Using the beacon transmit power may lead to an unnecessarily large range for the CTS.

Figure 18:
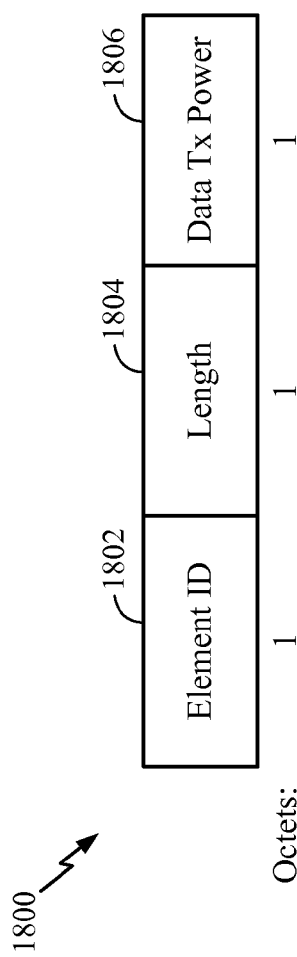
FIG. 18 illustrates an example beacon information element (IE) for indicating the transmit power of data frames transmitted from an access point (AP), in accordance with certain aspects of the present disclosure.

FIG. 18 illustrates an example beacon information element (IE) 1800 for indicating the transmit power of data frames transmitted from an access point (AP), in accordance with certain aspects of the present disclosure. An AP may transmit beacons with the beacon IE 1800. The beacon IE 1800 may comprise an element ID field 1802, a length field 1804, and a data transmit power field 1806. The data transmit power field 1806 may contain the highest transmit power used by the AP to send data frames. Each of the fields 1802, 1804, 1806 may have a length of one octet (8 bits).

Figure 19:
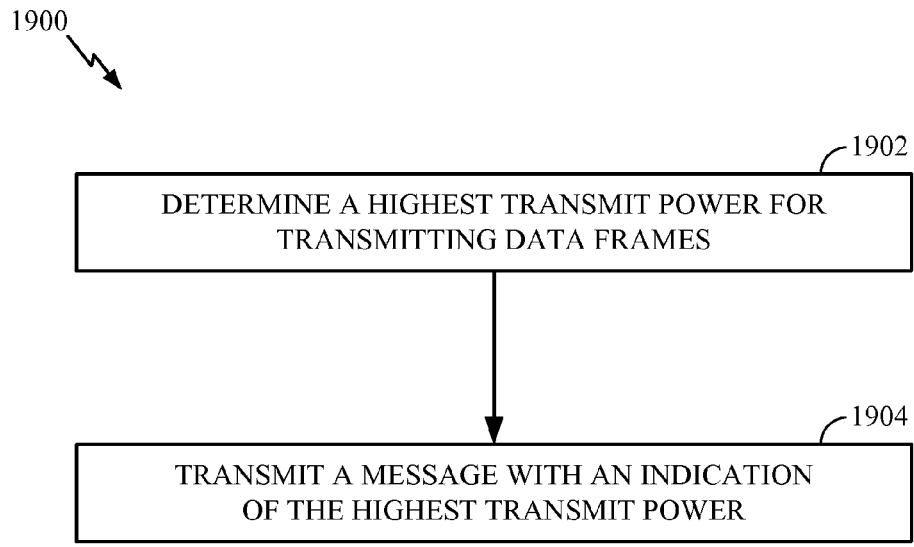
FIG. 19 illustrates example operations to transmit, from the perspective of an AP, a broadcast message with an indication of the highest transmit power for transmitting data frames, in accordance with certain aspects of the present disclosure.
Figure 19A:
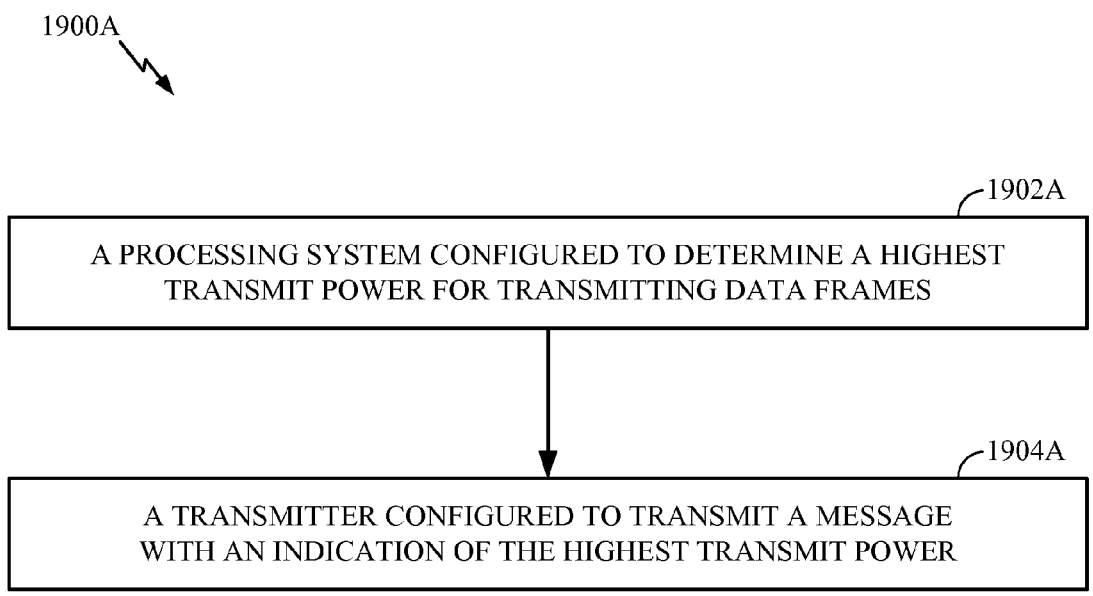
FIG. 19A illustrates example components for performing the operations shown in FIG. 19.

FIG. 19 illustrates example operations 1900 to transmit, from the perspective of an AP, for example, a broadcast message with an indication of the highest transmit power for transmitting data frames, in accordance with certain aspects of the present disclosure. The operations 1900 may begin, at 1902, with the AP determining a highest transmit power for transmitting data frames. At 1904, the AP may transmit a (broadcast) message with an indication of the highest transmit power. The AP may transmit the message via one or more channels in a TVWS.

According to certain aspects, the message may comprise a beacon. The indication may comprise an IE in the beacon. For other aspects, the message may comprise another indication of a second transmit power for transmitting the message. The AP may transmit the message using the second transmit power.

Figure 20:
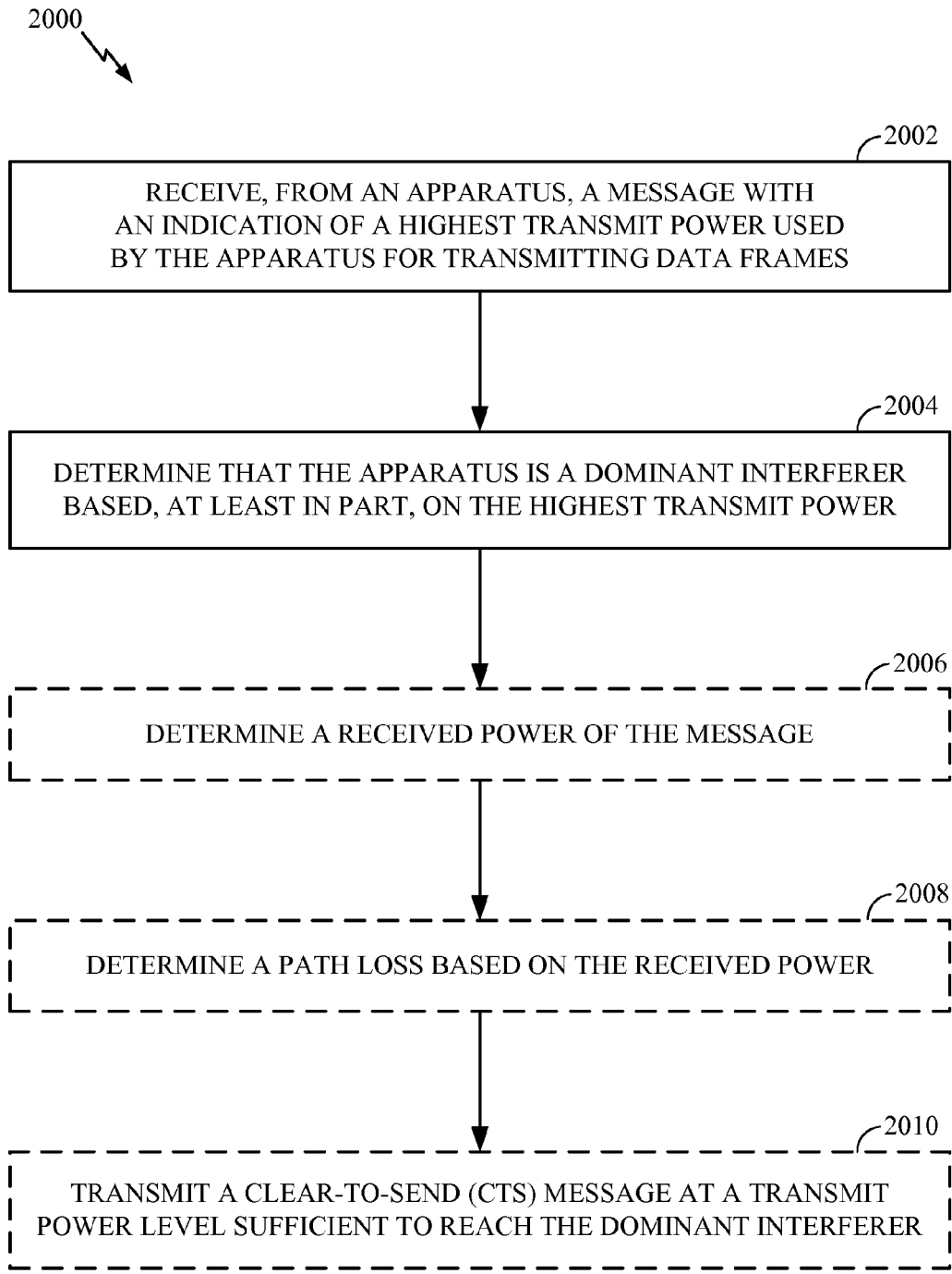
FIG. 20 illustrates example operations to determine, from the perspective of a STA, dominant interferers based on a received broadcast message with an indication of a highest transmit power for transmitting data frames, in accordance with certain aspects of the present disclosure.
Figure 20A:
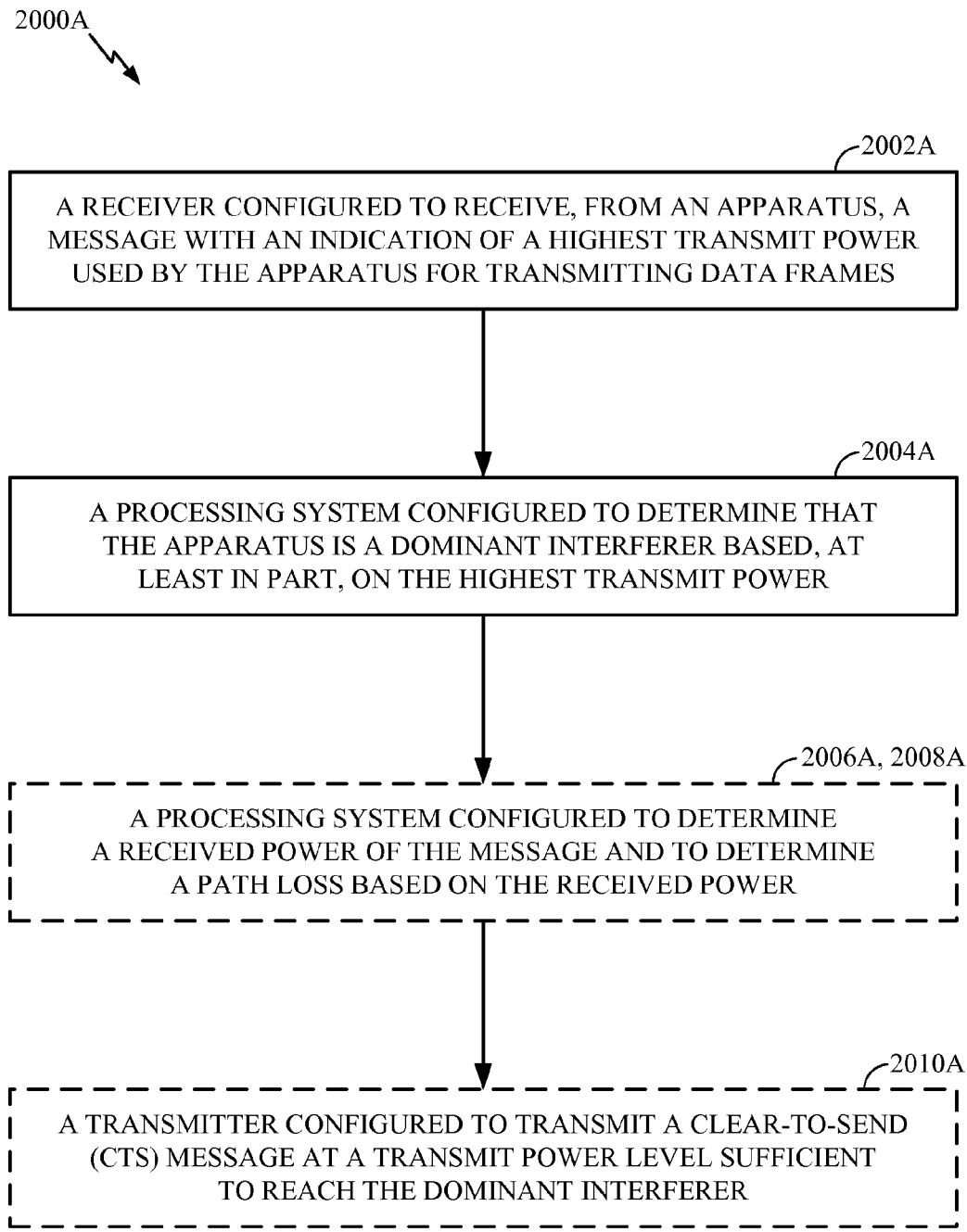
FIG. 20A illustrates example components for performing the operations shown in FIG. 20.

FIG. 20 illustrates example operations 2000 to determine, from the perspective of a STA, for example, dominant interferers based on a received broadcast message with an indication of a highest transmit power for transmitting data frames, in accordance with certain aspects of the present disclosure. The operations 2000 may begin, at 2002, with the STA receiving, from an apparatus (e.g., an AP), a (broadcast) message with an indication of a highest transmit power used by the apparatus for transmitting data frames. For certain aspects, the message comprises a beacon, and the indication comprises an IE in the beacon. At 2004, the STA may determine that the apparatus is a dominant interferer based, at least in part, on the highest transmit power. For certain aspects, this determination may also be based on the path loss. At 2006, the STA may determine a received power of the message. The STA may determine a path loss based on the received power at 2008. At 2010, the STA may transmit a CTS message at a transmit power level sufficient to reach the dominant interferer.

According to certain aspects, the message may comprise another indication of a second transmit power for transmitting the message. The STA may determine a received power of the message and a path loss based on the received power and the second transmit power. The STA may determine that the dominant is a dominant interferer is also based on the path loss.

For certain aspects, the STA may receive from multiple apparatuses (e.g., a second or a third apparatus), messages with indications of the highest transmit power used by each of the apparatuses for transmitting data frames. For example, the STA may receive from a second apparatus another message with another indication of a highest transmit power used by the second apparatus for transmitting data frames. The STA may determine that any one or more of these apparatuses are dominant interferers based, at least in part, on the highest transmit power used by each of the apparatuses. The STA may then transmit a CTS message at the highest transmit power level sufficient to reach all of the dominant interferers (i.e., at the higher of a first transmit power level sufficient to reach the apparatus and a second transmit power level sufficient to reach the second apparatus).

Figure 21:
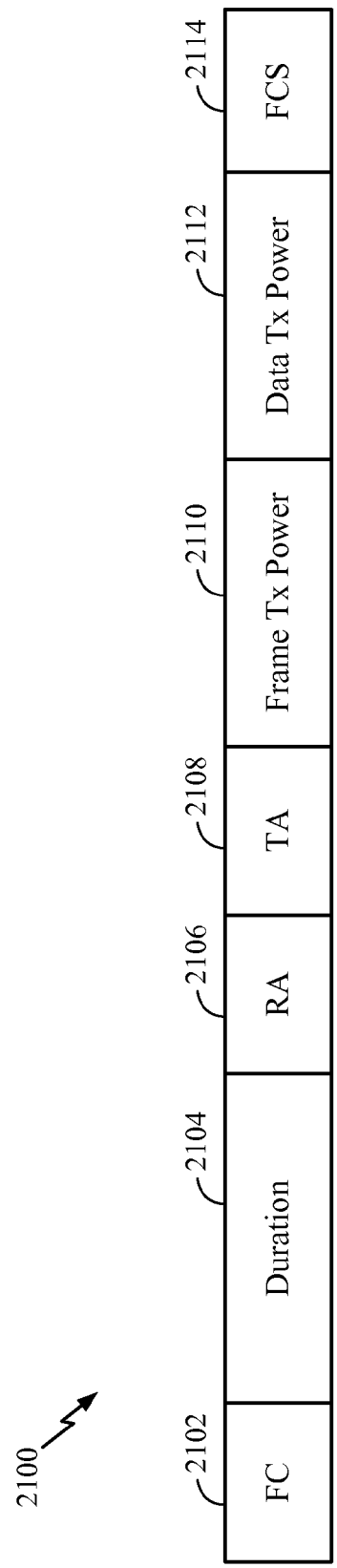
FIG. 21 illustrates an example control or management frame format with an IE for indicating the transmit power of data frames transmitted from a STA and another IE for indicating the transmit power used for transmitting the control or management frame, in accordance with certain aspects of the present disclosure.

FIG. 21 illustrates an example control or management frame format 2100 with an IE for indicating the transmit power of data frames transmitted from a STA and another IE for indicating the transmit power used for transmitting the control or management frame, in accordance with certain aspects of the present disclosure. The frame format 2100 may comprise a frame control (FC) field 2102, a duration field 2104, a receiver address (RA) field 2106, a transmitter address (TA) field 2108, a frame transmit power field 2110, a data transmit power field 2112, and a frame check sequence (FCS) field 2114. The data transmit power field 2112 may indicate the transmit power for transmitting data frames, while the frame transmit power field 2110 may indicate the power used for transmitting the control or management frame containing the frame transmit power field 2110.

For certain aspects, the control or management frame may be a power calibration frame, which may be a type of management frame. For other aspects, the control or management frame format 2100 may be an RTS frame format augmented with the frame and data transmit power fields 2110, 2112.

Figure 22:
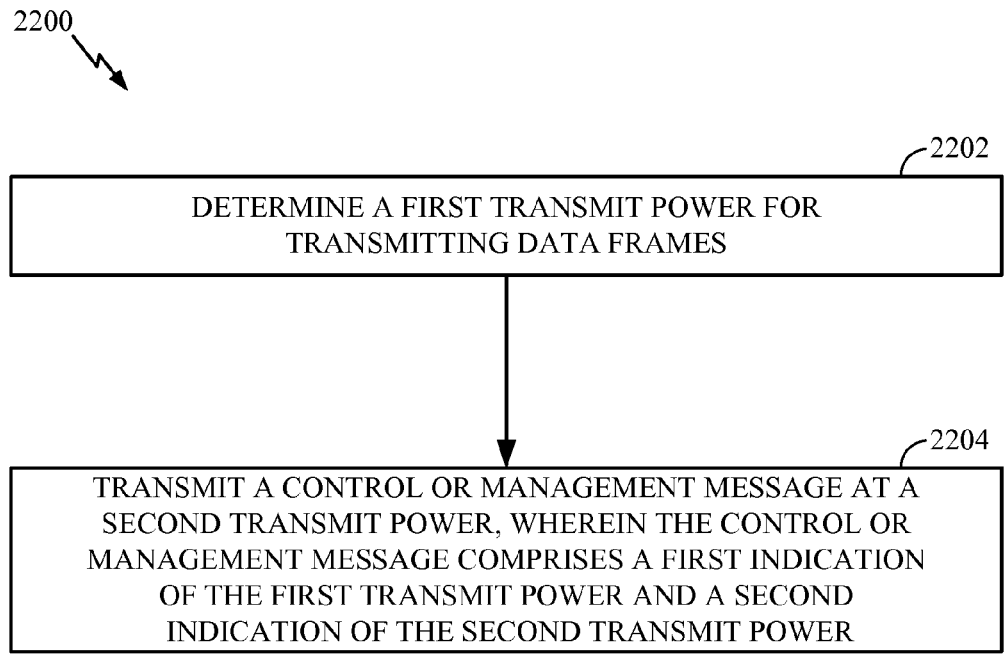
FIG. 22 illustrates example operations to transmit, from the perspective of a STA, a control or management message with an indication of a transmit power for transmitting data frames and another indication of a transmit power used when transmitting the control or management message, in accordance with certain aspects of the present disclosure.
Figure 22A:
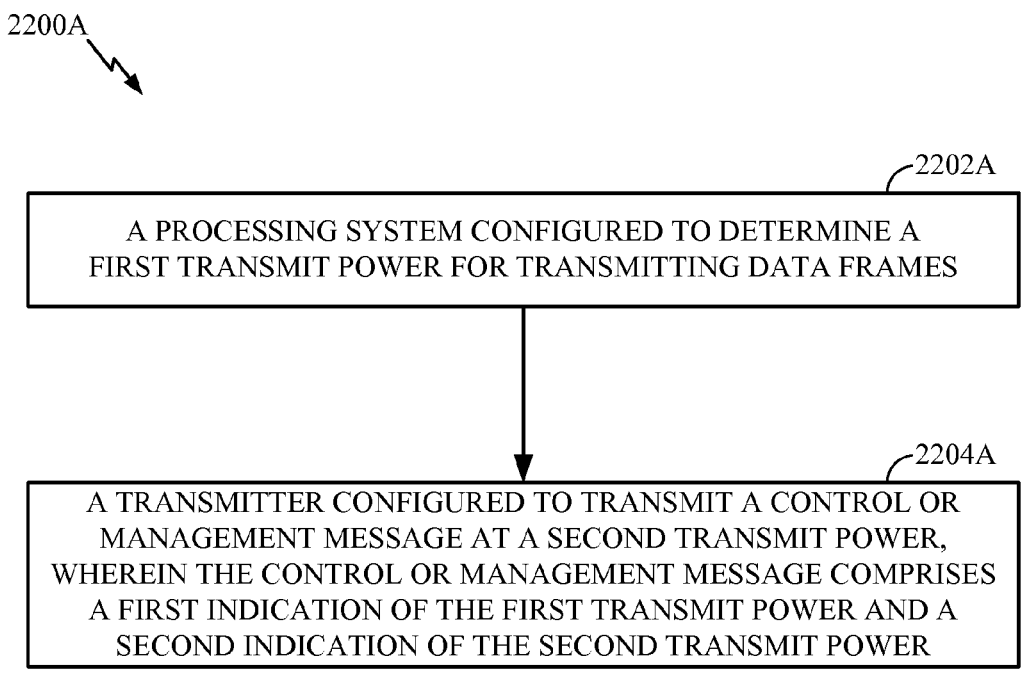
FIG. 22A illustrates example components for performing the operations shown in FIG. 22.

FIG. 22 illustrates example operations 2200 to transmit, from the perspective of a STA, for example, a control or management message with an indication of a transmit power for transmitting data frames and another indication of a transmit power used when transmitting the control or management message, in accordance with certain aspects of the present disclosure. The operations 2200 may begin, at 2202, with the STA determining a first transmit power for transmitting data frames. At 2204, the STA may transmit a control or management message at a second transmit power. The control or management message may comprise a first indication of the first transmit power and a second indication of the second transmit power. The STA may transmit the control or management message via one or more channels in a TVWS.

For certain aspects, the control or management message may comprise a RTS message or a power calibration frame. According to certain aspects, the first and second indications may comprise an IE in the control or management message.

Figure 23:
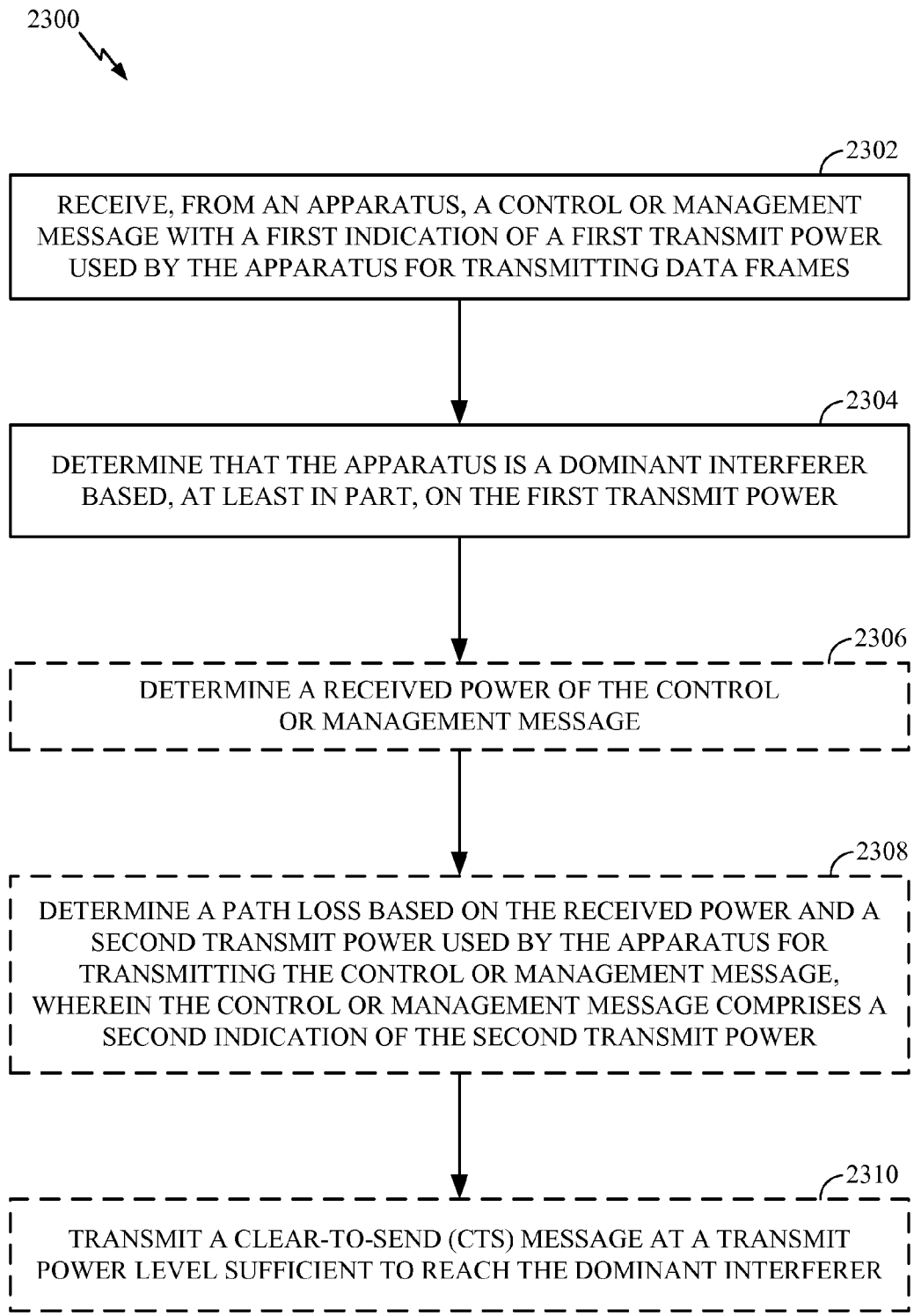
FIG. 23 illustrates example operations to determine, from the perspective of a STA, dominant interferers based on a received control or management message with an indication of a transmit power for transmitting data frames and another indication of a transmit power used when transmitting the control or management message, in accordance with certain aspects of the present disclosure.
Figure 23A:
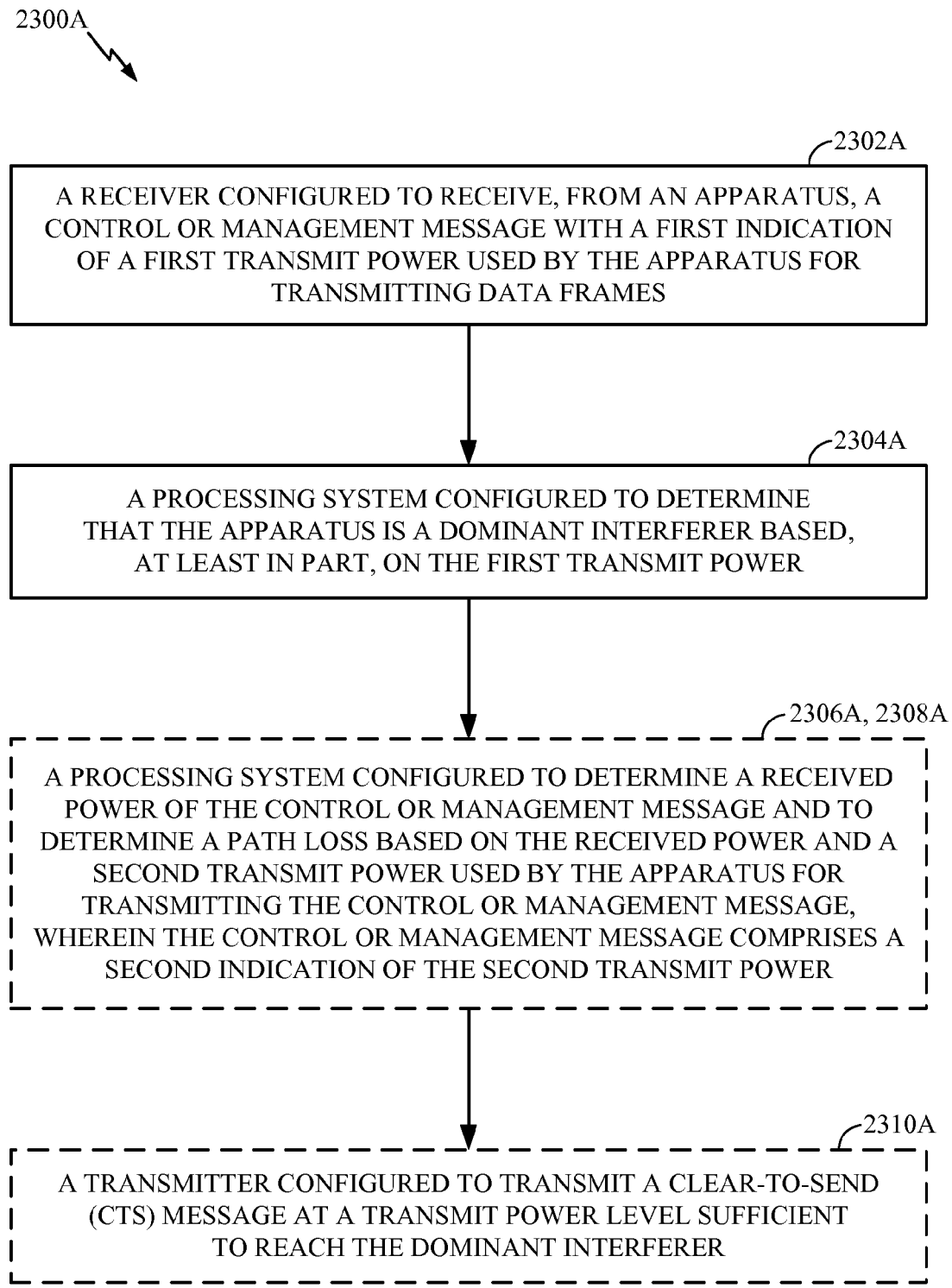
FIG. 23A illustrates example components for performing the operations shown in FIG. 23.

FIG. 23 illustrates example operations 2300 to determine, from the perspective of a STA, for example, dominant interferers based on a received control or management message with an indication of a transmit power for transmitting data frames and another indication of a transmit power used when transmitting the control or management message, in accordance with certain aspects of the present disclosure. The operations 2300 may begin, at 2302, with the STA receiving from an apparatus (e.g., another STA), a control or management message with a first indication of a first transmit power used by the apparatus for transmitting data frames. The STA may receive the control or management message via one or more channels in a TVWS. For certain aspects, the control or management message may also comprise a second indication of a second transmit power used by the apparatus for transmitting the control or management message. At 2304, the STA may determine that the apparatus is a dominant interferer based, at least in part, on the first transmit power.

At 2306, the STA may determine a received power of the control or management message. The STA may determine a path loss based on the received power and the second transmit power at 2308. For certain aspects, the STA may determine that the apparatus is a dominant interferer at 2304 based on the path loss, as well as the first transmit power. At 2310, the STA may transmit a CTS message at a transmit power level sufficient to reach the dominant interferer.

For certain aspects, the control or management message may comprise a RTS message or a power calibration frame. According to certain aspects, one of the first and second indications may comprise an IE in the control or management message.

For certain aspects, the STA may receive, from a second apparatus, another control or management message with a third indication of a third transmit power used by the second apparatus for transmitting data frames. The STA may determine that the second apparatus is another dominant interferer based, at least in part, on the third transmit power. The STA may also transmit a CTS message at the higher of a first transmit power level sufficient to reach the apparatus and a second transmit power level sufficient to reach the second apparatus.

Figure 7A:
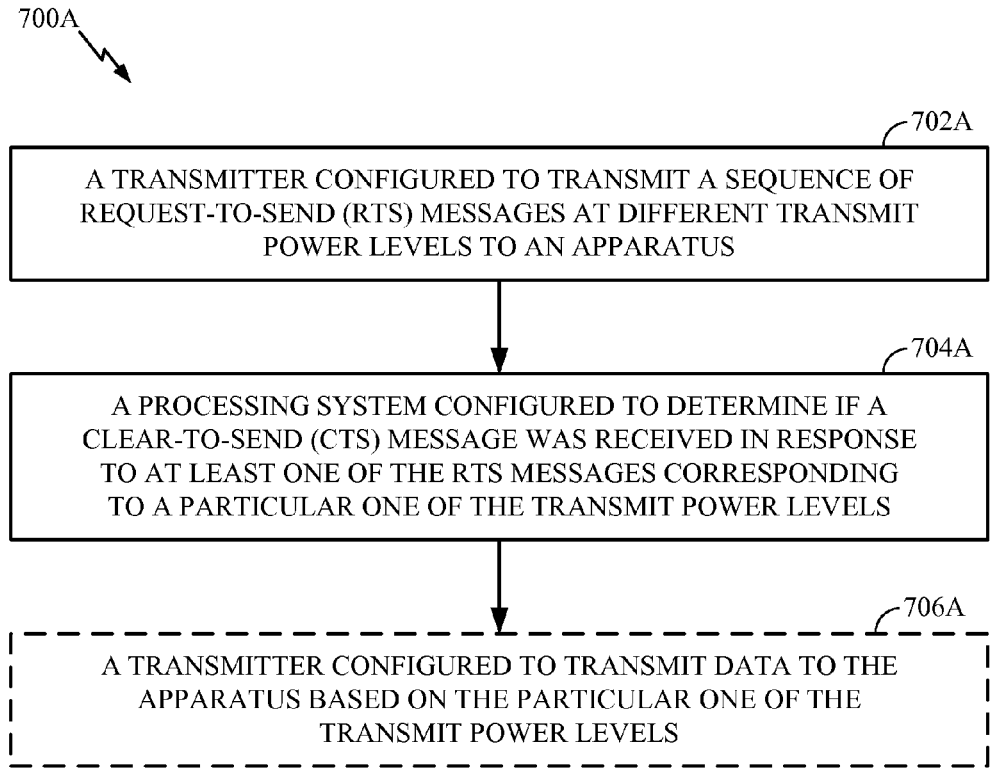
FIG. 7A illustrates example components for performing the operations shown in FIG. 7.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, operations 700 illustrated in FIG. 7 correspond to components 700A illustrated in FIG. 7A.

For example, means for transmitting may comprise a transmitter, such as the transmitter unit 222 of the access point 110 illustrated in FIG. 2, the transmitter unit 254 of the user terminal 120 depicted in FIG. 2, or the transmitter 310 of the wireless device 302 shown in FIG. 3. Means for receiving may comprise a receiver, such as the receiver unit 222 of the access point 110 illustrated in FIG. 2, the receiver unit 254 of the user terminal 120 depicted in FIG. 2, or the receiver 312 of the wireless device 302 shown in FIG. 3. Means for processing, means for determining, means for identifying, or means for adjusting may comprise a processing system, which may include one or more processors, such as the RX data processor 270, the TX data processor 288, and/or the controller 280 of the user terminal 120 or the RX data processor 242, the TX data processor 210, and/or the controller 230 of the access point 110 illustrated in FIG. 2. Means for storing may comprise memory or other storage media, such as the memory 306 of the wireless device 302 shown in FIG. 3.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
    a processing system configured to determine a highest transmit power for transmitting data frames from the apparatus; and
    a transmitter configured to transmit a message with an indication of the highest transmit power,
    wherein the message comprises another indication of a second transmit power for transmitting the message, wherein the transmitter is configured to transmit the message using the second transmit power.

2. The apparatus of claim 1, wherein the message comprises a beacon.

3. The apparatus of claim 2, wherein the indication comprises an information element (IE) in the beacon.

4. The apparatus of claim 1, wherein the transmitter is configured to transmit the message via one or more channels in a television white space (TVWS).

5. The apparatus of claim 1, wherein the message comprises a broadcast message.

6. A method for wireless communications, comprising:
    determining a highest transmit power for transmitting data frames; and
    transmitting a message with an indication of the highest transmit power,
    wherein the message comprises another indication of a second transmit power for transmitting the message, wherein the transmitting comprises transmitting the message using the second transmit power.

7. The method of claim 6, wherein the message comprises a beacon.

8. The method of claim 7, wherein the indication comprises an information element (IE) in the beacon.

9. The method of claim 6, wherein transmitting the message comprises transmitting the message via one or more channels in a television white space (TVWS).

10. The method of claim 6, wherein the message comprises a broadcast message.

11. An apparatus for wireless communications, comprising:
    means for determining a highest transmit power for transmitting data frames from the apparatus; and
    means for transmitting a message with an indication of the highest transmit power,
    wherein the message comprises another indication of a second transmit power for transmitting the message, wherein the means for transmitting is configured to transmit the message using the second transmit power.

12. A non-transitory computer-readable medium comprising instructions executable to:
    determine a highest transmit power for transmitting data frames from an apparatus; and
    transmit a message from the apparatus with an indication of the highest transmit power,
    wherein the message comprises another indication of a second transmit power for transmitting the message, wherein the transmitting comprises transmitting the message using the second transmit power.

13. An access point, comprising:
    at least one antenna;
    a processing system configured to determine a highest transmit power for transmitting data frames from the access point; and
    a transmitter configured to transmit, via the at least one antenna, a message with an indication of the highest transmit power,
    wherein the message comprises another indication of a second transmit power for transmitting the message, wherein the transmitting comprises transmitting the message using the second transmit power.

14. A first apparatus for wireless communications, comprising:
    a receiver configured to receive, from a second apparatus, a message with an indication of a highest transmit power used by the second apparatus for transmitting data frames; and
    a processing system configured to determine that the second apparatus is a dominant interferer based, at least in part, on the highest transmit power, wherein the message comprises another indication of a second transmit power used by the second apparatus for transmitting the message, and wherein the processing system is configured to determine that the second apparatus is the dominant interferer based on the highest transmit power and the second transmit power; and
    a transmitter configured to transmit a clear-to-send (CTS) message at a transmit power level sufficient to reach the dominant interferer.

15. The first apparatus of claim 14, wherein the processing system is configured to determine a received power associated with the message and to determine a path loss based on the received power.

16. The first apparatus of claim 15, wherein the processing system is configured to determine that the second apparatus is the dominant interferer based on the highest transmit power and the path loss.

17. The first apparatus of claim 14, wherein the processing system is configured to determine a received power associated with the message and to determine a path loss based on the received power and the second transmit power.

18. The first apparatus of claim 17, wherein the processing system is configured to determine that the second apparatus is the dominant interferer based on the highest transmit power and the path loss.

19. The first apparatus of claim 14, wherein the receiver is configured to receive, from a third apparatus, another message with another indication of a highest transmit power used by the third apparatus for transmitting data frames and wherein the processing system is configured to determine that the third apparatus is another dominant interferer based, at least in part, on the highest transmit power used by the third apparatus.

20. The first apparatus of claim 19, further comprising a transmitter configured to transmit a clear-to-send (CTS) message at the higher of a first transmit power level sufficient to reach the third apparatus and a second transmit power level sufficient to reach the second apparatus.

21. The first apparatus of claim 14, wherein the receiver is configured to receive the message via one or more channels in a television white space (TVWS).

22. A method for wireless communications, comprising:
receiving, from an apparatus, a message with an indication of a highest transmit power used by the apparatus for transmitting data frames; and
determining that the apparatus is a dominant interferer based, at least in part, on the highest transmit power, wherein the message comprises another indication of a second transmit power used by the apparatus for transmitting the message, wherein determining that the apparatus is the dominant interferer is based on the highest transmit power and the second transmit power; and
transmitting a clear-to-send (CTS) message at a transmit power level sufficient to reach the dominant interferer.

23. The method of claim 22, further comprising:
determining a received power associated with the message; and
determining a path loss based on the received power.

24. The method of claim 23, wherein determining that the apparatus is the dominant interferer is also based on the path loss.

25. The method of claim 22, wherein the method further comprises:
determining a received power associated with the message; and
determining a path loss based on the received power and the second transmit power.

26. The method of claim 25, wherein determining that the apparatus is the dominant interferer is also based on the path loss.

27. The method of claim 22, further comprising:
receiving, from a second apparatus, another message with another indication of a highest transmit power used by the second apparatus for transmitting data frames; and
determining that the second apparatus is another dominant interferer based, at least in part, on the highest transmit power used by the second apparatus.

28. The method of claim 27, further comprising transmitting a clear-to-send (CTS) message at the higher of a first transmit power level sufficient to reach the apparatus and a second transmit power level sufficient to reach the second apparatus.

29. The method of claim 22, wherein receiving the message comprises receiving the message via one or more channels in a television white space (TVWS).

30. A first apparatus for wireless communications, comprising:
means for receiving, from a second apparatus, a message with an indication of a highest transmit power used by the second apparatus for transmitting data frames; and
means for determining that the second apparatus is a dominant interferer based, at least in part, on the highest transmit power, wherein the message comprises another indication of a second transmit power used by the second apparatus for transmitting the message, wherein means for determining that the apparatus is the dominant interfere is based on the highest transmit power and the second transmit power; and
means for transmitting a clear-to-send (CTS) message at a transmit power level sufficient to reach the dominant interferer.

31. A non-transitory computer-readable medium comprising instructions executable to:
receive, from an apparatus, a message with an indication of a highest transmit power used by the apparatus for transmitting data frames; and
determine that the apparatus is a dominant interferer based, at least in part, on the highest transmit power, wherein the message comprises another indication of a second transmit power used by the apparatus for transmitting the message, wherein determining that the apparatus is the dominant interferer is based on the highest transmit power and the second transmit power; and
transmit a clear-to-send (CTS) message at a transmit power level sufficient to reach the dominant interferer.

32. A wireless node, comprising:
at least one antenna;
a receiver configured to receive, from an apparatus via the at least one antenna, a message with an indication of a highest transmit power used by the apparatus for transmitting data frames; and
a processing system configured to determine that the apparatus is a dominant interferer based, at least in part, on the highest transmit power, wherein the message comprises another indication of a second transmit power used by the apparatus for transmitting the message, wherein means for determining that the apparatus is the dominant interfere is based on the highest transmit power and the second transmit power; and
a transmitter configured to transmit a clear-to-send (CTS) message at a transmit power level sufficient to reach the dominant interferer.

33. An apparatus for wireless communications, comprising:
a processing system configured to determine a first transmit power for transmitting data frames from the apparatus; and
a transmitter configured to transmit a control or management message at a second transmit power, wherein the control or management message comprises a first indication of the first transmit power and a second indication of the second transmit power.

34. The apparatus of claim 33, wherein the control or management message comprises a request-to-send (RTS) message.

35. The apparatus of claim 33, wherein the control or management message comprises a power calibration frame.

36. The apparatus of claim 33, wherein one of the first and second indications comprises an information element (IE) in the control or management message.

37. The apparatus of claim 33, wherein the transmitter is configured to transmit the control or management message via one or more channels in a television white space (TVWS).

38. A method for wireless communications, comprising:
determining a first transmit power for transmitting data frames; and
transmitting a control or management message at a second transmit power, wherein the control or management message comprises a first indication of the first transmit power and a second indication of the second transmit power.

39. The method of claim 38, wherein the control or management message comprises a request-to-send (RTS) message.

40. The method of claim 38, wherein the control or management message comprises a power calibration frame.

41. The method of claim 38, wherein one of the first and second indications comprises an information element (IE) in the control or management message.

42. The method of claim 38, wherein transmitting the control or management message comprises transmitting the control or management message via one or more channels it a television white space (TVWS).

43. An apparatus for wireless communications, comprising:
means for determining a first transmit power for transmitting data frames from the apparatus; and
means for transmitting a control or management message at a second transmit power, wherein the control or management message comprises a first indication of the first transmit power and a second indication of the second transmit power.

44. A non-transitory computer-readable medium comprising instructions executable to:
determine a first transmit power for transmitting data frames from an apparatus; and
transmit a control or management message at a second transmit power, wherein the control or management message comprises a first indication of the first transmit power and a second indication of the second transmit power.

45. A wireless node, comprising:
at least one antenna;
a processing system configured to determine a first transmit power for transmitting data frames from the wireless node; and
a transmitter configured to transmit, via the at least one antenna, a control or management message at a second transmit power, wherein the control or management message comprises a first indication of the first transmit power and a second indication of the second transmit power.

46. A first apparatus for wireless communications, comprising:
a receiver configured to receive, from a second apparatus, a control or management message with a first indication of a first transmit power used by the second apparatus for transmitting data frames; and
a processing system configured to determine that the second apparatus is a dominant interferer based, at least in part, on the first transmit power, wherein the control or management message comprises a second indication of a second transmit power used by the second apparatus for transmitting the control or management message; and
a transmitter configured to transmit a clear-to-send (CTS) message at a transmit power level sufficient to reach the dominant interferer.

47. The first apparatus of claim 46, wherein the control or management message comprises a request-to-send (RTS) message.

48. The first apparatus of claim 46, wherein the control or management message comprises a power calibration frame.

49. The first apparatus of claim 46, wherein one of the first and second indications comprises an information element (IE) in the control or management message.

50. The first apparatus of claim 46, wherein the processing system is configured to determine a received power associated with the control or management message and to determine a path loss based on the received power and the second transmit power.

51. The first apparatus of claim 50, wherein the processing system is configured to determine that the second apparatus is the dominant interferer based on the first transmit power and the path loss.

52. The first apparatus of claim 46, wherein the receiver is configured to receive, from a third apparatus, another control or management message with a third indication of a third transmit power used by the third apparatus for transmitting data frames and wherein the processing system is configured to determine that the third apparatus is another dominant interferer based, at least in part, on the third transmit power.

53. The first apparatus of claim 52, further comprising a transmitter configured to transmit a clear-to-send (CTS) message at the higher of a first transmit power level sufficient to reach the third apparatus and a second transmit power level sufficient to reach the second apparatus.

54. The first apparatus of claim 46, wherein the receiver is configured to receive the control or management message via one or more channels in a television white space (TVWS).

55. A method for wireless communications, comprising:
receiving, from an apparatus, a control or management message with a first indication of a first transmit power used by the apparatus for transmitting data frames; and
determining that the apparatus is a dominant interferer based, at least in part, on the first transmit power, wherein the control or management message comprises a second indication of a second transmit power used by the apparatus for transmitting the control or management message; and
transmitting a clear-to-send (CTS) message at a transmit power level sufficient to reach the dominant interferer.

56. The method of claim 55, wherein the control or management message comprises a request-to-send (RTS) message.

57. The method of claim 55, wherein the control or management message comprises a power calibration frame.

58. The method of claim 55, wherein one of the first and second indications comprises an information element (IE) in the control or management message.

59. The method of claim 55, further comprising:
determining a received power associated with the control or management message; and
determining a path loss based on the received power and the second transmit power.

60. The method of claim 59, wherein determining that the apparatus is the dominant interferer is also based on the path loss.

61. The method of claim 55, further comprising:
receiving, from a second apparatus, another control or management message with a third indication of a third transmit power used by the second apparatus for transmitting data frames; and
determining that the second apparatus is another dominant interferer based, at least in part, on the third transmit power.

62. The method of claim 61, further comprising transmitting a clear-to-send (CTS) message at the higher of a first transmit power level sufficient to reach the apparatus and a second transmit power level sufficient to reach the second apparatus.

63. The method of claim 55, wherein receiving the control or management message comprises receiving the control or management message via one or more channels in a television white space (TVWS).

64. A first apparatus for wireless communications, comprising:

means for receiving, from a second apparatus, a control or management message with a first indication of a first transmit power used by the second apparatus for transmitting data frames; and means for determining that the second apparatus is a dominant interferer based, at least in part, on the first transmit power, wherein the control or management message comprises a second indication of a second transmit power used by the apparatus for transmitting the control or management message; and means for transmitting a clear-to-send (CTS) message at a transmit power level sufficient to reach the dominant interferer.

65. A non-transitory computer-readable medium comprising instructions executable to:

receive, from an apparatus, a control or management message with a first indication of a first transmit power used by the apparatus for transmitting data frames; and determine that the apparatus is a dominant interferer based, at least in part, on the first transmit power, wherein the control or management message comprises a second indication of a second transmit power used by the apparatus for transmitting the control or management message; and transmit a clear-to-send (CTS) message at a transmit power level sufficient to reach the dominant interferer.

66. A wireless node, comprising:

at least one antenna;

a receiver configured to receive, from an apparatus via the at least one antenna, a control or management message with a first indication of a first transmit power used by the apparatus for transmitting data frames; and a processing system configured to determine that the apparatus is a dominant interferer based, at least in part, on the first transmit power, wherein the control or management message comprises a second indication of a second transmit power used by the apparatus for transmitting the control or management message; and a transmitter configured to transmit a clear-to-send (CTS) message at a transmit power level sufficient to reach the dominant interferer.

* * * * *